(12) United States Patent
Iwamoto

(10) Patent No.: US 10,242,712 B2
(45) Date of Patent: Mar. 26, 2019

(54) VIDEO SYNCHRONIZATION BASED ON AUDIO

(71) Applicant: YAMAHA CORPORATION, Hamamatsu-shi (JP)

(72) Inventor: Kazuhide Iwamoto, Hamamatsu (JP)

(73) Assignee: YAMAHA CORPORATION, Hamatsu-Shi (JP)

(*) Notice: Subject to any disclaimer, the term of this patent is extended or adjusted under 35 U.S.C. 154(b) by 0 days.

(21) Appl. No.: 15/389,478

(22) Filed: Dec. 23, 2016

(65) Prior Publication Data

US 2017/0103784 A1 Apr. 13, 2017

Related U.S. Application Data

(62) Division of application No. 14/450,934, filed on Aug. 4, 2014, now abandoned.

(30) Foreign Application Priority Data

Aug. 5, 2013 (JP) .................................. 2013-162751
Aug. 5, 2013 (JP) .................................. 2013-162752
Aug. 5, 2013 (JP) .................................. 2013-162753

(51) Int. Cl.
  *G11B 27/10* (2006.01)
  *H04N 5/76* (2006.01)
  (Continued)

(52) U.S. Cl.
  CPC .............. *G11B 27/10* (2013.01); *H04N 5/76* (2013.01); *H04N 9/8211* (2013.01); *H04N 9/87* (2013.01)

(58) Field of Classification Search
  CPC ....... G11B 27/10; G11B 27/031; G11B 27/34; H04N 9/87; H04N 21/4307; H04N 21/8547
  (Continued)

(56) References Cited

U.S. PATENT DOCUMENTS 5,808,722 A  9/1998 Suzuki
6,148,135 A  11/2000 Suzuki
(Continued)

FOREIGN PATENT DOCUMENTS

JP  H09205618 A  8/1997
JP  H09311689 A  12/1997
(Continued)

OTHER PUBLICATIONS

Notification of Reasons for Refusal issued in Japanese Patent Application No. 2013-162753 dated May 23, 2017. English translation provided.

(Continued)

*Primary Examiner* — Thai Q Tran
*Assistant Examiner* — Jose M Mesa
(74) *Attorney, Agent, or Firm* — Rossi, Kimms & McDowell LLP

(57) ABSTRACT

A content reproduction screen displays a plurality of content items. A video reproduction processing section reproduces substantially simultaneously videos of a plurality of content items on a screen. An audio reproduction processing section reproduces substantially simultaneously audio signals of a plurality of content items. During reproduction of a plurality of content items, a comparison is made between a current reproduction position of the audio signal in an audio reproduction processing section and a current reproduction position of each video in the video reproduction processing section, and, if a discrepancy between the compared current reproduction positions is equal to or greater than a threshold value, the current reproduction position of the video is corrected on the basis of the current reproduction position of the audio signal. In this way, the current reproduction position of each video is synchronized with the reproduction position of the audio signal.

21 Claims, 9 Drawing Sheets

(51) Int. Cl.
*H04N 9/87* (2006.01)
*H04N 9/82* (2006.01)

(58) Field of Classification Search
USPC .......................................................... 386/239
See application file for complete search history.

(56) References Cited

U.S. PATENT DOCUMENTS

| | | | | |
|---|---|---|---|---|
| 6,477,315 | B1* | 11/2002 | Ohomori | G11B 27/034 345/629 |
| 8,244,103 | B1* | 8/2012 | Shore | G11B 27/34 386/278 |
| 2003/0231871 | A1* | 12/2003 | Ushimaru | H04N 21/4104 386/207 |
| 2008/0152309 | A1* | 6/2008 | Shih | G11B 27/10 386/201 |
| 2010/0293455 | A1 | 11/2010 | Bloch | |

FOREIGN PATENT DOCUMENTS

| | | |
|---|---|---|
| JP | 2001036867 A | 2/2001 |
| JP | 2008139560 A | 6/2008 |
| JP | 2009010548 A | 1/2009 |
| JP | 2012145643 A | 8/2012 |
| JP | 2012244343 A | 12/2012 |
| JP | 2013005423 A | 1/2013 |
| WO | 2008069037 A1 | 6/2008 |

OTHER PUBLICATIONS

Bachmann et al. "Cubase 7 Operation Manual", Steinberg Media Technologies GmbH, published on Feb. 13, 2012, available on the Internet at <http://japan.steinberg.net/fileadmin/redaktion_japan/documents/Cubase/Cubase_7_Operation_Manual_jp.pdf>. pp. 1-913.

Office Action issued in U.S. Appl. No. 14/450,934 dated Oct. 6, 2016.

Notification of Reasons for Refusal issued in Japanese Patent Application No. 2013-162751 dated Feb. 28, 2017. English translation provided.

Office Action issued in U.S. Appl. No. 16/016,032 dated Jan. 24, 2019.

* cited by examiner

VIDEO SYNCHRONIZATION BASED ON AUDIO

FIELD OF THE INVENTION

The present invention relates generally to a content reproduction (playback) method, apparatus and program for reproducing a content item comprising a combination of video data and audio data, and it relates more particularly to a technique for synchronously reproducing video data and audio data constituting a one content item. Further, the present invention relates to a technique for reproducing a plurality of content items substantially simultaneously. Furthermore, the present invention relates to a technique for creating a musical work by combining a plurality of performance content items.

BACKGROUND OF THE INVENTION

It has been known to simultaneously reproduce a plurality of content items each comprising video data and audio data. Such content items are reproduced in various environments, such as a general-purpose environment where a personal computer is used. In cases where a plurality of content items are to be reproduced simultaneously or synchronously, a plurality of videos to be simultaneously reproduced would be undesirably displaced from each other, a plurality of audio signals to be reproduced synchronously would be undesirably displaced from each other, or videos and audio signals would be undesirably displaced from each other, unless reproduction (playback) timing between the content items is adjusted or corrected appropriately. There have heretofore been known various techniques for synchronizing respective reproduction timing of content items.

Japanese Patent Application Laid-open Publication No. HEI-9-205618 (hereinafter referred to as "Patent Literature 1") corresponding to U.S. Pat. Nos. 5,808,722 and 6,148,135 discloses, as an example of processing for synchronously reproducing a video and an audio signal, synchronizing a reproduction-controlling system clock and the video and audio signal by correcting the system clock to conform to or match a synchronizing signal of a picture frame of the video. However, with the known construction where synchronization processing is executed on the basis of a video as disclosed in Patent Literature 1, such synchronization processing would occur frequently depending on the reproducing environment. Because video data has a great data quantity and a high compression ratio, an enormous number of arithmetic operations would be required if the synchronization processing is executed frequently. Because of a heavy load of the aforementioned synchronization processing, content reproduction cannot be resumed immediately following the synchronization, so that the video cannot sometimes be reproduced smoothly. Particularly, in cases where a plurality of content items are to be reproduced simultaneously, synchronism between the content items may be undesirably lost due to the heavy load of the aforementioned synchronization processing. For example, in a case where one music piece (more specifically, an ensemble performance of one music piece) is to be reproduced with a plurality of content items, and particularly if reproduction of a plurality of audio signals of the content items is displaced from each other, reproduction of the music piece would fail musically. Thus, where a plurality of content items are to be reproduced simultaneously in a musical application, it is particularly necessary to secure synchronism between a plurality of audio signals.

Further, Japanese Patent Application Laid-open Publication No. 2009-10548 (hereinafter referred to as "Patent Literature 2") discloses, as an example of processing for synchronizing a plurality of recorded data (coded video/audio data), a technique which performs a pattern matching comparison between sound volume levels of the plurality of recorded data (coded video/audio data) to extract a time difference between the plurality of recorded data and then records the plurality of recorded data in a synchronized state by correcting time information possessed by the individual recorded data in accordance with the extracted time difference. However, the technique disclosed in Patent Literature 2, which requires complicated operations for extracting sound volume levels of a given time period and then performing a pattern matching comparison between the extracted sound volume levels, is not suited for synchronization processing performed in real time during content data reproduction.

Furthermore, there have also been known multi-video reproduction apparatus which display a plurality of moving pictures (also referred to as video moving pictures) on a single screen. For example, Japanese Patent Application Laid-open Publication No. 2012-244343 (hereinafter referred to as "Patent Literature 3") discloses a technique which automatically determines a layout, on the screen, of a plurality of video moving pictures on the basis of respective photographing information of the moving pictures and displays the video moving pictures on the screen in the determined layout. This Patent Literature 3 also discloses, as a method for changing the moving pictures displayed on the screen, starting reproduction of another video moving picture upon completion of the reproduction of any one of the moving pictures (preceding moving pictures) displayed on the screen. With this method, however, it is not possible to change over to another video moving picture before the reproduction of any one the preceding moving pictures ends.

Further, Japanese Patent Application Laid-open Publication No. 2001-36867 (hereinafter referred to as "Patent Literature 4") discloses, as a method for additionally reproducing another video moving picture during reproduction of a plurality of video moving pictures in a multi-video reproduction apparatus, a technique in accordance with which a reproduction position of the other moving picture is moved in advance on a background in accordance with a current reproduction position of a plurality of moving pictures so that, in response to a display instruction, the other video moving picture can be displayed on the screen from the reproduction position having been moved to on the background as above. However, with this technique, where the reproduction position of the video moving picture to be added is moved in advance on the background, a user cannot newly designate a video moving picture during the reproduction of the plurality of video moving pictures.

Also, there have been known digital audio workstation (so-called "DAW") systems constructed to be capable of performing a series of music-production-related processing, such as recording, editing and mixing of audio data (waveform data) and MIDI (Musical Instrument Digital Interface) data, by use of a general-purpose personal computer. Typically, on a GUI (Graphical User Interface) screen employed in such a DAW system, pictures representative of recorded audio data (waveform data) and MIDI events are arranged in a time-series order on a time axis extending in a horizontal direction of the screen, for each of a plurality of recording tracks arranged in a vertical direction of the screen (see, for example, a non-patent literature "Cubase 7 Operation Manual", Steinberg Media Technologies GmbH, published on Feb. 13, 2012, available on the Internet at <http://japan.steinberg.net/fileadmin/redaktion_japan/documents/Cubase/Cubase_7_Operation_Manual_jp.pdf>. The aforementioned DAW system is designed to be capable of creating a musical work in a precise manner and thus difficult for an unaccustomed user, unfamiliar with a music performance or musical work production of a musical work, to use.

Furthermore, International Patent Application No. WO2008/069037 (hereinafter referred to as "Patent Literature 5") corresponding to Japanese Patent Application Laid-open Publication No. 2008-139560 discloses an example of a music content creation system which comprises a server apparatus and client terminals interconnected via a communication network, and in which the server apparatus acquires audio and videos from a plurality of client terminals and creates one music content item by synthesizing the acquired audio and videos. According to the music content creation system disclosed in Patent Literature 5, one music content can be produced through cooperation of a plurality of participants, i.e. by the plurality of participants sharing production of a plurality of sections (such as an intro section, melody A section, melody B section, . . . ending section of a musical instrument) of the one music content. This music content creation system can be used easily even by a user unfamiliar with a music performance. However, this music content creation system is merely constructed such that a plurality of participants bring content corresponding to their assignments (content parts) like in so-called "collection of messages" and these content parts are synthesized by the server apparatus; it does not allow the individual participants to create and edit their musical works on their own or independently of each other, neither does it provide interfaces for such purposes.

Furthermore, Japanese Patent Application Laid-open Publication No. 2012-145643 (hereinafter referred to as "Patent Literature 6") discloses an audio data recording/using system which records, on multiple tracks, a music performance executed in a rehearsal studio using recording facilities installed in the rehearsal studio and then not only stores the recording into a studio server but also uploads the recording to a shared server on the Internet so that the recording can be reproduced freely via any of user terminals connected to the shared server. However, this audio data recording/using system is based on the premise that a plurality of human players of musical instruments actually gather at the rehearsal studio, and thus, it requires various labor, such as one to gather a plurality of human players and to adjust schedules of the human players for the gathering.

SUMMARY OF THE INVENTION

In view of the foregoing prior art problems, it is an object of the present invention to permit reliable synchronization between video data and audio data with simple processing in reproduction of a content item comprising a combination of video data and audio data.

It is another object of the present invention to allow any one of a plurality of currently-reproduced content items to be changed over to another content item while continuing reproduction of a plurality of videos based on the plurality of content items.

It is still another object of the present invention to allow a musical work to be created with ease using performance content items each comprising video data and audio data.

In order to accomplish the above-mentioned object, the present invention provides an improved computer-implemented method for reproducing a content item comprising a combination of audio data and video data, which comprises: an audio reproduction step of reproducing an audio signal based on the audio data for reproduction of the content item; a video reproduction step of reproducing a video based on the video data for reproduction of the content item; a detection step of detecting a discrepancy between a reproduction position of the audio signal and a reproduction position of the video during the reproduction of the content item; and a correction step of, when the discrepancy detected by the detection step is greater than a threshold value, correcting the reproduction position of the video on the basis of the reproduction position of the audio signal.

According to the present invention constructed as above, when the discrepancy between the reproduction position of the audio signal and the reproduction position of the video during the reproduction of the content item is greater than the threshold value, the reproduction position of the video is corrected on the basis of the reproduction position of the audio signal, so that the reproduction position of the audio signal and the reproduction position of the video are synchronized with each other. Because such synchronization processing is performed on the basis of the reproduction position of the audio signal when the discrepancy is greater than the threshold value, it is possible to reduce frequency of the synchronization, thereby reducing a processing load. Because the present invention is constructed to determine, on the basis of the reproduction position of the audio signal, whether or not the synchronization is necessary, the reproduction of the audio signal is given a higher priority than the synchronization of the video with the audio signal, and thus, the present invention can reliably minimize a possibility of unwanted disruption of the reproduction of the audio signal. Thus, the present invention is well suited for musical applications. Further, because synchronization between the video data and the audio data can be secured with simple processing, the present invention can achieve stable reproduction of any content items each comprising audio data and video data even in an ordinary environment, such as a general-purpose network system or a web browser, where variation in processing load is hard to predict.

In an embodiment, when a plurality of the content items are to be reproduced, the audio reproduction step mixes a plurality of audio signals based on audio data of a plurality of content items into one audio signal and reproduces the mixed audio signal, the video reproduction step reproduces a plurality of videos in a parallel manner based on video data of the plurality of content item, and the detection step detects a discrepancy between a current reproduction position of the mixed audio signal and a reproduction position of each of the plurality of videos. When a discrepancy greater than the threshold value has been detected between the current reproduction position of the plurality of audio signals mixed into one audio signal and the reproduction position of any of the plurality of videos, the reproduction position of the video is cause to match (conform to) the reproduction position of the audio signal. Because the plurality of audio signals are reproduced after being mixed into one audio signal, no particular synchronization mechanism is required for synchronization between (among) the audio signals. For the plurality of videos, on the other hand, the present invention can reduce the frequency of the synchronization and reduce the processing load, without strictly synchronizing between (among) the plurality of videos. As a result, each of the plurality of videos can be reproduced smoothly.

According to another aspect of the present invention, there is provided an improved computer-implemented method for reproducing substantially simultaneously a plurality of content items each comprising audio data and video data, which comprises: an audio reproduction step of reproducing substantially simultaneously a plurality of audio signals on the basis of respective audio data of the plurality of content items; a video reproduction step of reproducing substantially simultaneously a plurality of videos on the basis of respective video data of the plurality of content items; an acquisition step of, when a content item has been newly designated as an object of reproduction during reproduction of the plurality of content items, acquiring a current reproduction position of the audio signals; a first determination step of determining a reproduction position of a video of the newly-designated content item on the basis of the current reproduction position of the audio signals acquired by the acquisition step; and a step of starting reproduction of the video of the newly-designated content item at the reproduction position of the video of the newly-designated content item determined by the first determination step.

According to the present invention constructed as above, when a content item has been newly designated as an object of reproduction during reproduction of the plurality of content items, reproduction of the video of the newly-designated content item is started at the current reproduction position of the audio signal. For example, if the current reproduction position of the plurality of contents items being already reproduced is a position that is 10 seconds after the beginning thereof, the content item newly designated is reproduced from a position 10 seconds after the beginning thereof. Because the reproduction position of the video (moving picture) of the content item is caused to match the current reproduction position of the currently-reproduced audio signal, the processing load can be reduced as compared to the processing where respective reproduction positions of a plurality of videos are caused to match one another. Thus, changing a content item over to another content item during reproduction of a plurality of content items can be smoothly achieved.

With the aforementioned arrangements, the present invention achieves the superior advantageous benefit that it can change in realtime any one of a plurality of currently-reproduced content items over to another while still continuing the reproduction of the plurality of content items. Thus, a user can select and reproduce a desired content item as a new object of reproduction while visually checking the currently-reproduced content items without performing troublesome operations (operational labor), e.g. for stopping the reproduction of the content items.

According to still another aspect of the present invention, there is provided an improved computer-implemented method for creating a musical work based on combination of a plurality of performance content items, the performance content items each comprising video data and audio data, which comprises: a step of displaying a music creation screen having a plurality of blocks arranged in a matrix configuration for displaying the plurality of performance content items constituting the musical work, each of the blocks being capable of reproducing a video based on the video data of any one of the plurality of performance content items; a change step of, in response to a change instruction given by a user, changing the performance content item, placed in a user-selected one of the blocks, over to another performance content item selected by the user; and a step of, in response to a reproduction instruction given by the user, reproducing videos based on the video data of the performance content items placed in one or more of the blocks selected by the user and reproducing performance sound based on the audio data of the performance content items placed in the selected one or more blocks.

According to the present invention constructed as above, where a plurality of performance items are placed (displayed) in the individual blocks arranged in a matrix configuration showing a construction of the musical work in terms of two classified types of constituent elements, the plurality of performance items constituting the musical work can be managed block by block (on a block-by-block basis), and each of the blocks can reproduce a moving picture (video moving picture) based on video data. By changing the performance content item placed in any one of the blocks to another performance content item as desired, the present invention can readily edit or create a musical work. The video data of the performance content items are, for example, videos recording performances of various musical instruments. The present invention can change as desired a performance content item placed in any one of one or more blocks over to another performance content item while reproducing in realtime moving pictures and performance sound of performance content items placed in the one or more blocks. Thus, the user can readily create a musical work by combining performance content items while visually understanding or recognizing a plurality of performances, such as an ensemble performance, of a single music piece through moving pictures reproduced in the blocks.

Further, in an embodiment, the plurality of blocks arranged in a matrix configuration are constructed in such a manner that a time axis constituting the musical work is depicted or represented on one axis while types of performance sound constituting the musical work are depicted or represented on the other axis. Time sections (sections) corresponding to a plurality of music piece elements of the musical work may be represented as units on the time axis. In the embodiment, where the blocks are defined by the time axis and the types of performance sound, a plurality of performance content items placed in the blocks can be managed block by block, and thus, it is possible to readily grasp the construction of the musical work. Consequently, visual music creation using moving pictures can be done with an increased ease. Thus, the user can pseudo-experience an ensemble performance full of a feeling of unity and presence, by merely adding its own performance to the moving pictures representative of various types of performance sound placed in the blocks on the screen.

Thus, the present invention allows a musical work to be readily created by use of performance content items each comprising video data and audio data. By providing such an easy-to-use music creation tool, the present invention achieves the superior advantageous benefit that many persons interested in music creation can enjoy a creative pleasure of music production irrespective of their performance technique levels.

The present invention may be constructed and implemented not only as the method invention discussed above but also as an apparatus invention. Also, the present invention may be arranged and implemented as a software program for execution by a processor, such as a computer or DSP, as well as a non-transitory computer-readable storage medium storing such a software program. In this case, the program may be provided to a user in the storage medium and then installed into a computer of the user, or delivered from a server apparatus to a computer of a client via a communication network and then installed into the client's computer. Further, the processor used in the present invention may comprise a dedicated processor with dedicated logic built in hardware, not to mention a computer or other general-purpose processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE EMBODIMENTS

Now, with reference to the accompanying drawings, a description will be given about embodiments of a method, apparatus and program storage medium of the present invention.

Figure 1:
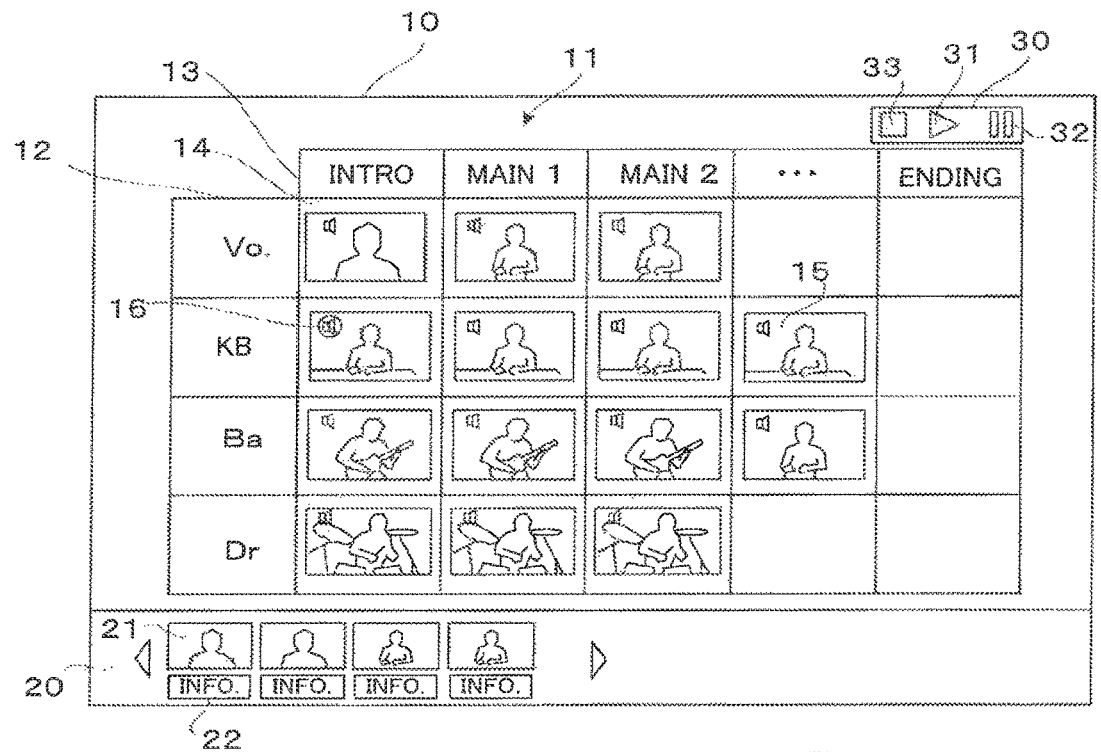
FIG. 1 is a diagram explanatory of an example of a content reproduction screen to which is applicable an embodiment of a content reproduction method of the present invention.

FIG. 1 is a diagram explanatory of an example of a content reproduction screen to which is applicable an embodiment of a content reproduction method of the present invention. The content reproduction screen 10 includes a content item display section 11 for displaying a plurality of content items 15, each comprising a combination of audio data and video data, in a parallel manner. On the content item display section 11, the plurality of content items 15 are displayed in a plurality of blocks 14 arranged in a matrix configuration. Each of the blocks 14 is a window for displaying one content item, and it is capable of reproducing a video based on video data of the displayed content item 15. Namely, the blocks (windows) 14 corresponding to the content items 15 are each an independent display element functioning as a video player.

The content reproduction screen 10 includes a reproduction control section 30, and the reproduction control section 30 includes a reproduction button image 31, a pause button image 32 and a stop button image 33. A user can use the buttons 31 to 33 of the reproduction control section 30 to control reproduction of a plurality of content items placed in the plurality of blocks 14. In response to a user's operation of the reproduction button image 31, not only a plurality of audio signals based on the audio data of the plurality of content items 15 are reproduced substantially simultaneously, but also a plurality of videos based on the video data of the plurality of content items 15 are reproduced substantially simultaneously in the corresponding blocks 14 (which they are placed in). A mute button is provided on the video in each of the blocks 14, and the user can use the mute button 16 to switch between mute-ON and mute-OFF states of the audio signal for each of the content items.

The user can select a desired one of the blocks 14 on the content reproduction screen 10 and switch or change as desired the content item 15, placed in the selected block 14, to another content item. As an example, the user can operate a content item selection screen 20 to give an instruction for changing the content item 15. The content item selection screen 20 displays selection candidate information representative of one or more content items 15 that are placeable in the user-selected block 14. The selection candidate information comprises, for example, various attribute information that includes thumbnail images 21, names, evaluations, comments, etc. of the one or more content items 15. In response to the user selecting a desired one of the blocks 14 and selecting one of the content items via the content item selection screen 20, the selected content item 15 is displayed in the selected block 14.

The content reproduction screen 10 employed in the instant embodiment is characterized in that, during reproduction of the plurality of content items 15 (during reproduction of a plurality of videos), a comparison is made between a reproduction position of an audio signal and a reproduction position of each of the videos, and in that, if a discrepancy has been detected between the reproduction position of the audio signal and the reproduction position of the video has been detected, the reproduction position of the video is corrected on the basis of the reproduction position of the audio signal so that the reproduction position of the video is synchronized to the reproduction position of the audio signal. Namely, "synchronization" here means causing the reproduction position of the audio signal and the reproduction signal of the video to match each other.

Figure 2:
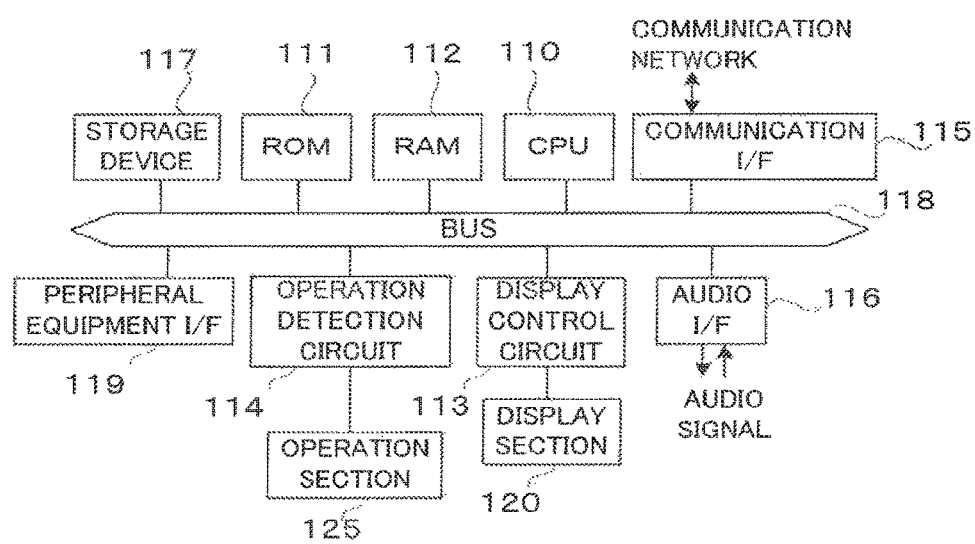
FIG. 2 is a block diagram showing an example electric hardware setup of an embodiment of a content reproduction apparatus of the present invention.

FIG. 2 is a block diagram showing an electric hardware setup of the embodiment of the content reproduction apparatus (specifically, client terminal) 100 capable of displaying the content reproduction screen 10 of FIG. 1. The content reproduction apparatus 100 includes a central processing unit (CPU) 110, a read-only memory (ROM) 111, a randomaccess memory (RAM) 112, a display control circuit 113, an operation detection circuit 114, a communication interface (communication I/F) 115, an audio interface (audio I/F) 116 and a storage device 117, and these components 110 to 117 are interconnected via a communication bus 118.

The CPU 1 controls general behavior of the content reproduction apparatus 100 by executing software programs stored in the ROM 111 or RAM 112. The ROM 111 is a non-volatile memory storing therein various programs for execution by the CPU 110 and various data. The RAM 112 is used as a loading area of a program to be executed by the CPU 1, as a working area for the CPU 1, and for other purposes.

To the display control circuit 113 is connected a display section 120 that is, for example, in the form of a liquid crystal display. On the basis of instructions from the CPU 110, the display control circuit 113 displays various information including the content reproduction screen 10 (FIG. 1). Further, to the operation detection circuit 114 is connected an operation section 125 including, for example, a keyboard, a mouse, etc. Using this operation section 125, the user performs various operations on a GUI (Graphical User Interface) displayed on the screen of the display section 120. Further, the CPU 110 acquires an operation event detected by the operation detection circuit 114 and performs a process corresponding to the detected operation event.

The content reproduction apparatus 100 is connected to a communication network 300 via the communication I/F 115. The communication I/F 115 may be a desired network interface, such as Ethernet (registered trademark). The content reproduction apparatus 100 further includes a peripheral equipment interface 119, such as a USB (Universal Serial Bus), for connecting peripheral equipment to the content reproduction apparatus 100. Examples of the peripheral equipment include a digital camera, a video camera and an audio recorder.

The audio I/F 116 includes audio signal input and output ports, an A/D conversion section and a D/A section, and it is connected to not-shown input equipment (e.g., microphone) and/or output equipment (e.g., speaker). The apparatus 100 can output and/or input analog audio signals via the audio I/F 116.

The storage device 117 in the instant embodiment comprises, for example, any of a hard disk, a flexible disk or floppy (registered trademark) disk (FD), a compact disk (CD), a digital versatile disk (DVD) and a semiconductor memory like a flash memory, which is capable of storing various data for use in the content reproduction apparatus 100.

Figure 3:
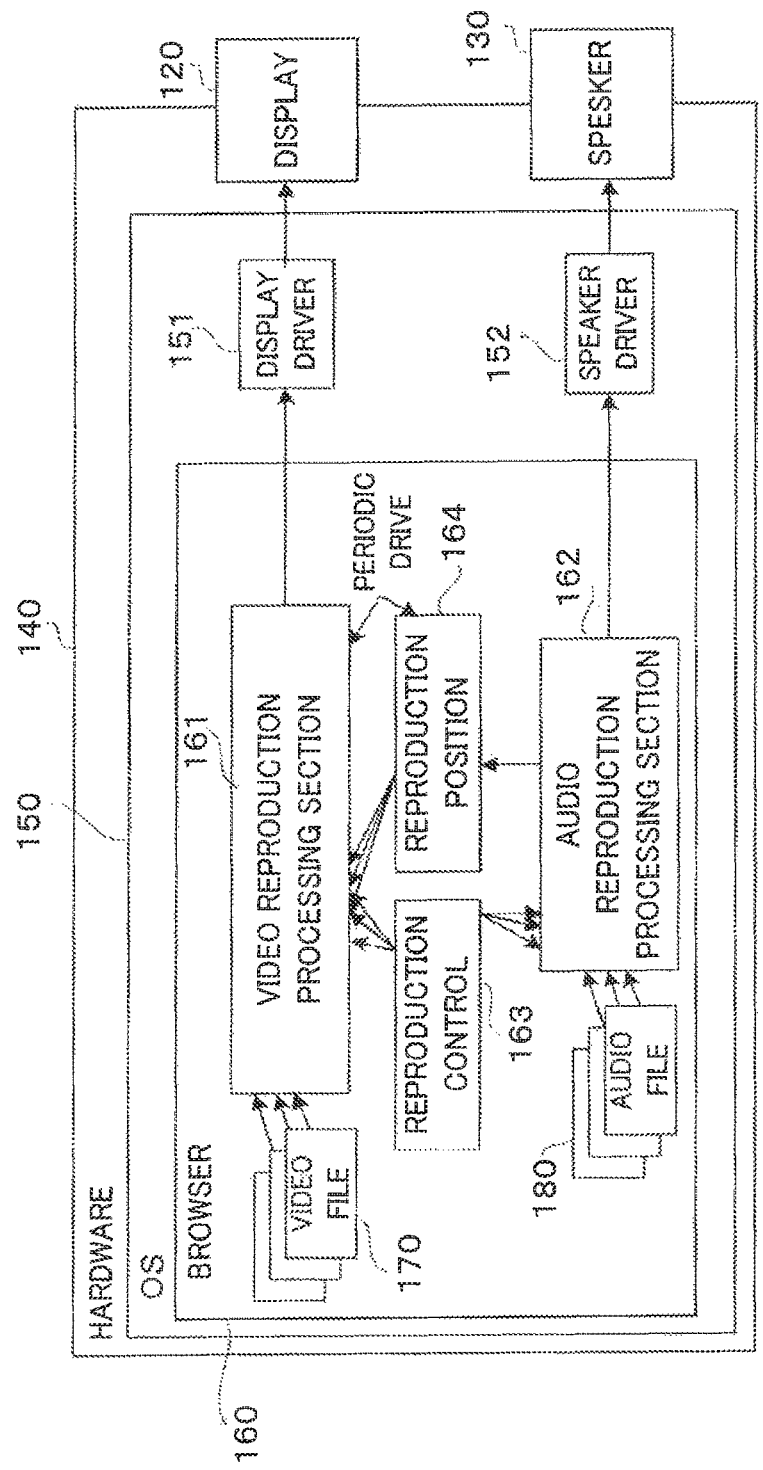
FIG. 3 is a block diagram explanatory of a content reproduction mechanism for reproducing a plurality of content items.

FIG. 3 is a block diagram explanatory of a processing construction of the content reproduction apparatus 100. Hardware 140 is a desired general-purpose computer device, such as a personal computer (PC), a tablet computer or a smart phone, which includes various hardware components including the display 120 and a speaker 130.

An operating system (OS) 150, which is basic software such as Windows (registered trademark), iOS (registered trademark) or Linux (registered trademark), provides functions for controlling hardware components that include a display driver 151 for controlling the display (display section) 120 and a speaker driver 152 for controlling the speaker 130.

A browser 160 is a well-known web browser, such as Google Chrome (registered trademark), FireFox (registered trademark) or Safari (registered trademark). The CPU 110 displays the content reproduction screen 10 of FIG. 1 on the browser 160. The browser 160 includes a video reproduction processing section 161 for implementing video reproduction processing by software processing, and an audio reproduction processing section 162 for implementing audio reproduction processing by software processing. The video reproduction processing section 161 performs video reproduction processing based on video data of content items 15 displayed in the individual blocks 14. Namely, video reproduction based on a plurality of video files 170 and audio signal reproduction based on a plurality of audio files 180 is managed separately from each other by independent modules, i.e. the video reproduction processing section 161 and the audio reproduction processing section 162.

The plurality of video files 170 and the plurality of audio files 180 are data files of video data and audio data included in the plurality of content items 15 that are to be reproduced, i.e. that are set as objects of reproduction. More specifically, the plurality of video files 170 and the plurality of audio files 180 are data files of video data and audio data of the content items 15 currently placed in the individual blocks 14 of the content reproduction screen 10. The plurality of video files 170 and the plurality of audio files 180 are stored in a suitable memory (RAM 112 or storage device 117).

The video reproduction processing section 161 simultaneously reproduces one or more videos based on one or more video files 170 to be reproduced and outputs the reproduced videos to the display driver 51. The audio reproduction processing section 162 mixes one or more audio files 180 to be reproduced into one audio signal (e.g., two-channel stereo signal), reproduces the mixed audio signal and outputs the mixed audio signal to the speaker driver 152. The audio reproduction processing section 162 performs impartment of various effects, audio characteristic control, such as sound volume control, mixdown of a plurality of audio signals, etc.

The browser 160, which is for example a web browser compliant with the "HTML5" specification, is constructed to implement the video reproduction processing section 161 and the audio reproduction processing section 162 by software processing using multimedia elements mounted in the web browser compliant with the "HTML5" specification. In this case, the video reproduction processing section 161 prepares a video reproduction module for each of the video files 170 and creates a video for each of the video files 170 through a drawing process. The videos created by the video reproduction modules for the video files 170 are drawn onto drawing areas (corresponding to the blocks 14) on the browser 160. Namely, the video reproduction processing section 161 performs a plurality of independent video reproduction processing for the video files 170 and outputs a plurality of videos, created by the individual video reproduction processing, onto the browser 160 in a parallel fashion.

The audio reproduction processing section 162 includes a plurality of Audio Node elements and an Audio Context for managing respective connection states of the Audio Node elements and implements one audio reproduction processing by means of the plurality of Audio Node elements and the respective connection states. The plurality of Audio Node elements are various audio processing elements, such as audio players corresponding to the audio files 180, various effect impartment elements, sound volume control elements, mixer elements, etc. A plurality of audio signals corresponding to the audio files 180 are subjected to a filter process, sound volume control, etc. and then output after being mixed down, for example, to a two-channel stereo signal.

A reproduction control module 163 controls, on the basis of a user's reproduction instruction (user's operation of any one of the buttons 31 to 33 on the reproduction control section 30), various operations pertaining to the video reproduction processing performed in the video reproduction processing section 161 for each of the video files 170 and the audio reproduction processing performed in the audio reproduction processing section 162 for each of the audio files 180. Examples of such operations include reproduction start, reproduction pause and reproduction stop.

A reproduction position control module 164 acquires a current reproduction position of an audio signal from the audio reproduction processing section 162 and determines a reproduction position of the video of each of the video files 170 on the basis of the acquired current reproduction position of the audio signal. The reproduction position control module 164 controls the video reproduction processing section 161 so that video reproduction of each of the video files 170 is started at the determined video reproduction position. This reproduction position control module 164 functions as a synchronization mechanism for synchronizing the audio signal and the video. Here, "synchronization" between the audio signal and the video means causing the reproduction position of the video to match (conform to) the reproduction position of the audio signal. By the synchronization mechanism being driven periodically, each time there has been detected a predetermined discrepancy between the reproduction position of the audio signal and the reproduction position of the video, the reproduction position of the video is corrected in conformity with the reproduction position of the audio signal. Note that the "reproduction position" corresponds to an elapsed reproduction time from a beginning or start position.

Figure 4:
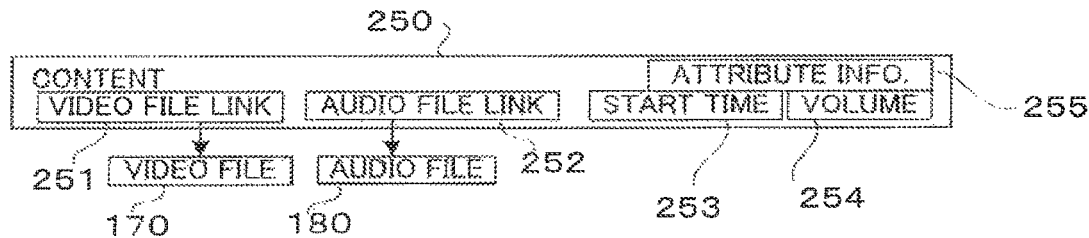
FIG. 4 is a diagram explanatory of an example data structure of a content item.

FIG. 4 is a diagram explanatory of a data structure of each of the content items 250. A plurality of such content items 250 are stored in a suitable memory (such as the RAM 111 or the storage device 117). The content item 250 includes link data 251 to the video file 170 and link data 252 to the audio file 180 so that it is associated with the video and audio files 170 and 180. The video file 170 and the audio file 180 are stored in another area than the content item 250, such as in a video/audio database, as independent files. In an alternative, however, the video file and the audio file may be stored in the corresponding content item 250.

Further, as an example, the content item 250 may include start time data 253 and sound volume data 254. The start time data 253 is data defining a beginning or start position of the content item 250. When the content item 250 is to be reproduced from the start portion of the content item 250, the reproduction of the content item 250 is started at the time position indicated by the start time data 253. The start time data 253 is set such that respective reproduction timing of a plurality of content items 250 to be simultaneously reproduced matches each other (one another). The sound volume data 254 is indicative of a sound volume of the content item 250, and typically, the sound volume data 254 is set such that respective sound volumes of a plurality of content items 250 to be reproduced simultaneously match each other (one another). Note that, as long as the respective reproduction timing and sound volumes of the plurality of content items 250 to be simultaneously reproduced can be caused to match each other (one another) at the time of content item reproduction, the content item 250 need not include such start time data 253 and sound volume data 254. As an example, in a case where the content item 250 is stored after its video file and audio file being normalized (automatically adjusted), the start time data 253 and sound volume data 254 are unnecessary. As another example, in a case where the content item 250 is stored after its video file and audio file are adjusted (automatically adjusted) in accordance with a user-designated start time and sound volume, the start time data 253 and sound volume data 254 are unnecessary.

Each of the content items 250 may further include various attribute information 255 including a thumbnail image, effecter data, evaluations, user comments, tag, etc. of the content item 250

When a plurality of content items 250 are to be simultaneously reproduced as in the case of the content reproduction screen 10 of FIG. 1, it is necessary to take into consideration synchronization among a plurality of videos, among a plurality of audio signals and between the audio signals and the videos. For such synchronization among a plurality of audio signals, the audio reproduction processing section 162 in the instant embodiment mixes the plurality of audio signals down to one audio signal (e.g., two-channel stereo signal) and reproduces the mixed audio signal. Thus, in the instant embodiment, no particular synchronization mechanism is required for synchronization among the audio signals. For video reproduction, on the other hand, a plurality of video reproduction processing, each of which is independent processing corresponding to one of video files, is activated in the video reproduction processing section 161 so that the plurality of videos are drawn onto the respective blocks 14 in a parallel fashion on the content reproduction screen 10, and thus, a particular mechanism is required for securing synchronism among the plurality of video reproduction processing. In the instant embodiment, as shown in FIG. 3, the reproduction position control module 164 causes the reproduction positions of the videos to match the reproduction position of the audio signal, so that synchronism between the audio signal and the individual videos and eventually synchronization among the plurality of videos can be secured.

Figure 5:
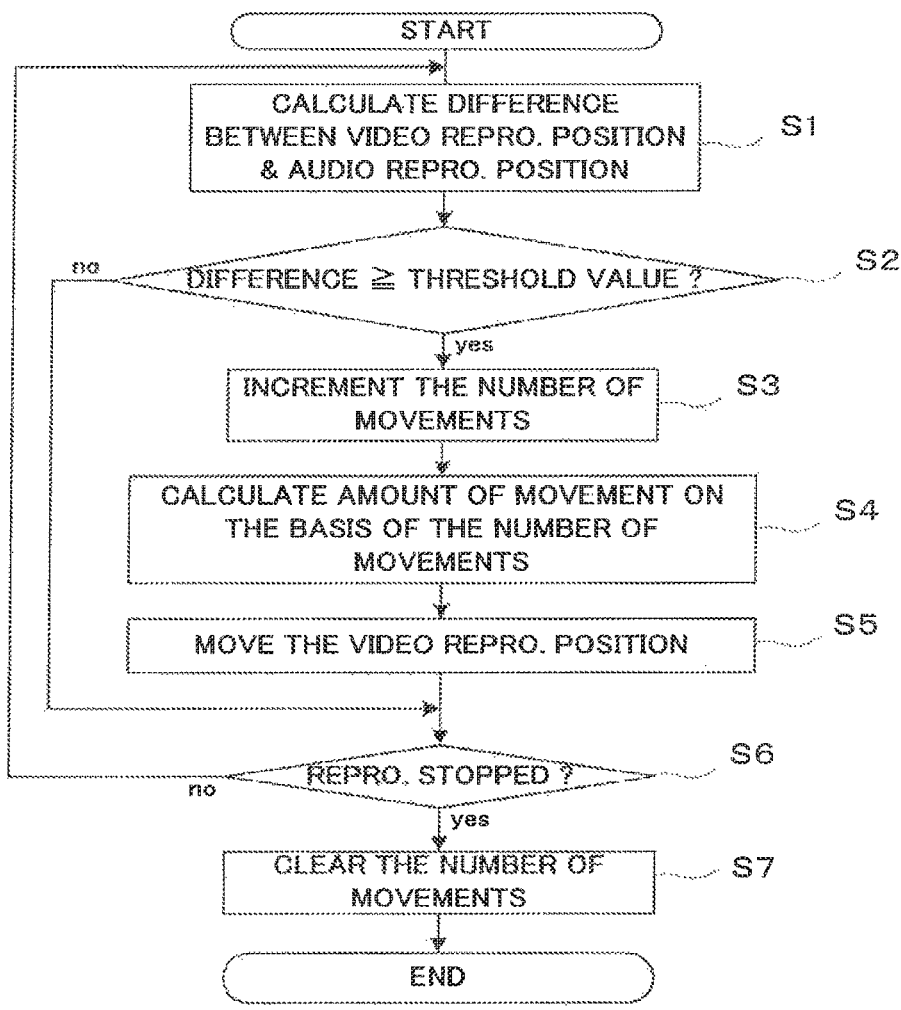
FIG. 5 is a flow chart showing an example operational sequence of content synchronization processing performed in the content reproduction apparatus.

FIG. 5 is a flow chart showing an example operational sequence of synchronization processing (i.e., reproduction position correction processing) performed by the CPU 110 of the content reproduction apparatus (or client terminal) 100 (more specifically, behavior of the reproduction position control module 164 shown in FIG. 4). This synchronization processing (i.e., reproduction position correction processing) is activated or started up during reproduction of a content item. As an example, the synchronization processing is started up periodically, e.g. every one second. At step S1, the CPU 110 acquires a current reproduction position of a video of the content item from the video reproduction processing section 161 and a current reproduction position of an audio signal of the content item from the audio reproduction processing section 162 and then calculates a difference between the current reproduction position of the video and the current reproduction position of the audio signal. As a modification, step S1 may be arranged to acquire time information from a clock function 165 (FIG. 6) provided by the browser 160, determine a reproduction position of the audio signal (audio reproduction position) on the basis of the time information and then calculate a difference between the thus-determined audio reproduction position and the current video reproduction position.

At next step S2, the CPU 110 compares the difference, calculated at step S1 above, with a threshold value for determining whether or not synchronization between the audio signal and the video is necessary. This step S2 functions as a step of detecting, during the reproduction of the content item, a discrepancy between the reproduction position of the audio signal and the reproduction position of the video, as well as a detection section that detects, during the reproduction of the content item, a discrepancy between the reproduction position of the audio signal and the reproduction position of the video. The threshold value may be set at a suitable value, such as 300 milliseconds. Such a threshold value of 300 milliseconds is a value that permits the difference between the reproduction position of the audio signal and the reproduction position of the video to be relatively great. Because the threshold value is set at a relatively great value like this, it is possible to reduce frequency at which the reproduction position of the video is corrected in accordance with the reproduction position of the audio signal as will be described later, thereby reducing a processing load.

If the difference between the reproduction position of the audio signal and the reproduction position of the video is equal to or greater than the threshold value (YES determination at step S2), the CPU 110 determines that there has occurred a discrepancy between the reproduction position of the audio signal and the reproduction position of the video. Thus, at next step S3, the CPU 110 increments a value of a number-of-movement parameter by one. The number-of-movement parameter is a parameter indicative of the number of times the reproduction position of the video has been moved in accordance with the current reproduction position of the audio signal (i.e., the number of movements), namely, the number of times a process for correcting the reproduction position of the video has been performed (i.e., the number of corrections). This step S3 functions as a step of incrementing a number-of-correction parameter each time the above-mentioned discrepancy has been detected, as well as a correction section that, if the detected discrepancy is greater than a threshold value, corrects the reproduction position of a moving picture of the video (video moving picture) on the basis of the reproduction position of the audio signal. At step S4, the CPU 110 calculates, on the basis of the number of movements set at step S3 above, an amount of movement for causing the reproduction position of the video to match the current reproduction position of the audio signal. Such an amount of movement is an amount over which the reproduction position of the video is to be moved, i.e. an amount of correction of the reproduction position of the video. The amount of movement can be calculated, for example, by "number of movements*100 msec" (where "*" is a mathematical symbol indicative of multiplication).

At step S5, the CPU 110 calculates a moved-to (i.e., corrected) reproduction position of the video on the basis of the current reproduction position of the audio signal acquired from the audio reproduction processing section 162 and the amount of movement calculated at step S4, and then it moves the reproduction position of the video (i.e., position of the reproduction of the video by the video reproduction processing section 161) to the calculated correction reproduction position of the video. In this way, the reproduction position of the video can be corrected to match the current reproduction position of the audio signal. The aforementioned operations at steps S3 to S5 function as a step of, when the detected discrepancy is greater than the threshold value, correcting the reproduction position of the video on the basis of the reproduction position of the audio signal. Because the instant embodiment is constructed to determine whether or not the synchronization is necessary, it can effectively reduce the frequency of the synchronization and reduce the processing load although exactness of the synchronization of the video is sacrificed. By giving priority to the reproduction of the audio signal over the synchronization between the video and the audio signal, the instant embodiment can reliably prevent disruption of the reproduction of the audio signal. Therefore, the instant embodiment is well suited for musical applications. Because the instant embodiment can secure synchronism between video data and audio data with simple processing, it can achieve stable reproduction of a content item comprising audio data and video data in an ordinary environment, such as a general-purpose or a web browser, where variation in processing load is hard to predict.

If, on the other hand, the difference between the current reproduction position of the video and the current reproduction position of the audio signal, calculated at step S1, is smaller than the threshold value (NO determination at step S2), the CPU 110 determines that there is no discrepancy between the current reproduction position of the video and the current reproduction position of the audio signal, so that it does not perform the aforementioned operations of steps S3 to S5 above.

During the reproduction of the content item (e.g., content item of a song) (NO determination at step S6), the CPU 110 repeats the aforementioned operations at and after step S1. Then, each time a discrepancy occurs between the current reproduction position of the video and the current reproduction position of the audio signal, the aforementioned operations of steps S3 to S5 above are performed. Each time such a discrepancy is detected (i.e., each time correction of the reproduction position is made), the CPU 110 increments of the number-of-movement parameter by one at step S3 above. According to the mathematical expression for calculating an amount of movement at step S4 above, the calculated amount of movement (amount of correction) gets greater as the number of movements (i.e., frequency of the synchronization) increases. In a case where a general-purpose environment (browser 160, OS 150 and hardware 140) is assumed as the content reproduction apparatus 100, a time required for starting the reproduction of the video at the moved-to position after the amount of movement has been determined at step S4 can vary depending on the execution environment and circumstances. Where such an execution environment is assumed, the aforementioned construction of increasing the amount of correction in accordance with the frequency of the synchronization (i.e., the accumulated number of movements) is advantageous in that it can make the reproduction position correction while probing for an optimal amount of movement (amount of correction) that cannot be identified beforehand. Further, the aforementioned construction of increasing the amount of correction in accordance with the frequency of the synchronization is advantageous in that it can prevent the synchronization processing load from rapidly increasing to adversely influence the overall behavior of the system.

Once the reproduction of the content item (song) is stopped (YES determination at step S6), the CPU 110 goes to step S7, where it clears or erases the value of the number-of-movement parameter and then terminates the synchronization processing of FIG. 5.

As a modification, the synchronization processing may be arranged to retain the number of movements, accumulated during the reproduction of the content item, without erasing the value of the number-of-movement parameter at step S7 above so that the accumulated number of movements can be used in the next and subsequent execution of the reproduction processing. In such a case, there arises a need for a rule of not only incrementing the value of the number-of-movement parameter at step S3 each time occurrence of the discrepancy is detected (i.e., the reproduction position correction is made) but also decrementing the value of the number-of-movement parameter when the difference between the current reproduction position of the video and the current reproduction position of the audio signal has decreased. For example, a quadratic expression of "square of the number of movements"*"100 milliseconds" may be used as the mathematical expression for calculating an amount of movement. Further, the aforementioned construction of using a predetermined fixed value, such as "100 milliseconds", for calculating an amount of movement may be replaced with a construction of collecting statistical information of the execution environment and using a value presumed from the statistical information. Further, the number of video files to be simultaneously reproduced (i.e., the number of video players to be simultaneously activated) may be used as a parameter of the mathematical expression for calculating an amount of movement. Furthermore, the synchronization processing of FIG. 5 may be constructed in such a manner that, in a case where the frequency of the synchronization is too high or where operating states of the apparatus are unstable, for example, the aforementioned threshold value used at step S2 above may be set at an even greater value so that the synchronization processing becomes more difficult to activate.

Figure 6:
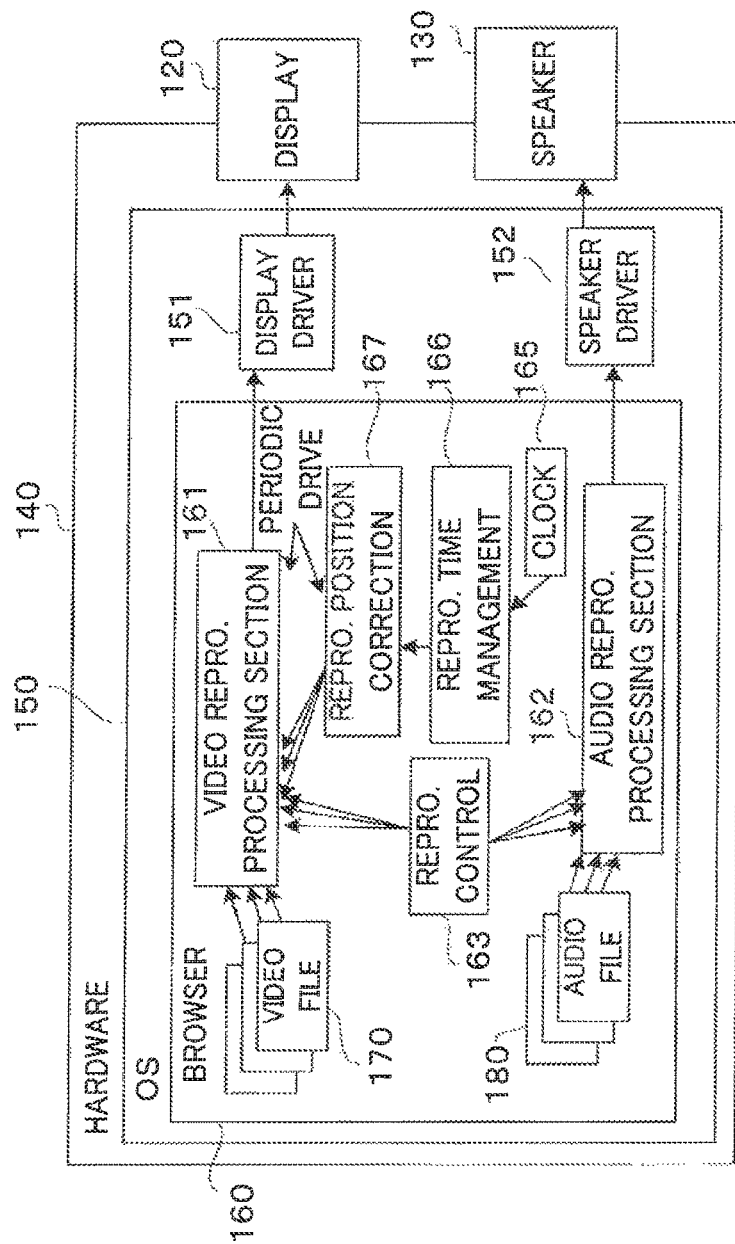
FIG. 6 is a block diagram explanatory of a modification of the content reproduction mechanism shown in FIG. 3.

The content synchronization processing of FIG. 5 performed in the instant embodiment has been described above as arranged in such a manner that the reproduction position control module 164 determines a reproduction position of the video on the basis of the current reproduction position of the audio signal acquired from the audio reproduction processing section 162. FIG. 6 shows a modification of the content synchronization processing where a reproduction position of the video is determined on the basis of the clock function 165 provided by the browser 160. In this modification, a reproduction time management section 166 acquires time information acting as a basis for correction (i.e., basic time information) from the clock 165 and compares the acquired time information and the current reproduction position of the video in the video reproduction processing section 161. If a difference between the time information acquired from the clock 165 and the current reproduction position of the video is equal to or greater than a threshold value (YES determination at step S2), then a reproduction position correction section 167 calculates an amount of movement on the basis of the number of movements and moves the position of reproduction of the video by the video reproduction processing section 161 on the basis of the calculated amount of movement to thereby cause the reproduction position of the video to match the basic time information (see steps S3 to S5 above). Thus, in this case too, it is possible to reduce the frequency of the synchronization and thereby reduce the processing load. Because the modification can secure synchronism between video data and audio data with simple processing, it can achieve stable reproduction of a content item comprising audio data and video data in an ordinary environment, such as a general-purpose network system or a web browser, where variation in the processing load is hard to predict. Note that the clock 165 may be implemented by any desired clock means, rather than being limited to the clock function provided by the browser 160, as long as it can provide time acting as a basis for content item reproduction.

Note that the processing for correcting the reproduction position of the video is not limited to the aforementioned one arranged to correct the reproduction position of the video on the basis of the amount of movement corresponding to the number of movements at steps S3 to S5 above and may be arranged in any desired manner as long as the reproduction position of the video is corrected on the basis of the reproduction position of the audio signal, or in conformity with the reproduction position of the audio signal, or with reference to the reproduction position of the audio signal. Further, a discrepancy between the current reproduction position of the video and the current reproduction position of the audio signal detected at step S2 may be of either a direction in which the reproduction position of the video gets behind the reproduction position of the audio signal or a direction in which the reproduction position of the video gets ahead of the reproduction position of the audio signal.

The following describe a second embodiment of the present invention in which music performance content items are employed as content items. In this case, the performance content items 15 each comprises a video (video data) representative of a music performance and performance sound (audio data). The audio data are data representative of a music performance, such as performance sound of a musical instrument or singing voice. The user can create one "song" by combination of the plurality of performance content items 15 placed on the content reproduction screen 10; such one "song" is, for example, a musical work of a single music piece (musical composition).

In the case where the music performance content items are employed as the content items, one axis (horizontal axis in the illustrated example of FIG. 1) in the matrix of the plurality of blocks 14 depicts or represents a time axis 13 constituting the musical work, while the other axis (vertical axis in the illustrated example of FIG. 1) in the matrix of the plurality of blocks 14 represents a plurality of types of performance sound (performance parts) 12 constituting the musical work. As an example, time sections (sections) corresponding to a plurality of music piece elements constituting one song are represented as units on the time axis 13. In an alternative, such sections may be represented on (i.e., associated with) the vertical axis, and performance parts may be represented on (i.e., associated with) the horizontal axis. It should be noted that elements to be associated with the vertical axis and horizontal axis of the matrix of the plurality of blocks 14 are not limited to the performance parts 12 and sections 13 as above and may be any other desired elements as long as they are two types of elements for classifying and managing the musical work.

The sections 13 are associated with music piece elements, such as "intro", "melody A", "melody B", . . . , "ending", respectively. In each of the blocks 14 belonging to one of the sections 13 is placed a performance content item 15 having, as its contents, the music piece element associated with that section 13. In the illustrated example of FIG. 1, the individual sections 13 are arranged from left to right in a time-serial order so as to indicate a temporal progression of one song. Each of the sections 13 has a predetermined reproduction time length, and an overall reproduction time length of the one song is defined by a sum of the respective reproduction time lengths of the plurality of sections 13. A display width (horizontal width in the illustrated example) of each of the sections 13 is set on the basis of a display size of the performance content item 15 placed in each of the corresponding blocks 14. Namely, although each of the sections 13 represents the time axis (time section), the horizontal width of the section 13 is not associated with its reproduction time length. Further, although the individual performance content items 15 are arranged in horizontal rows along the time axis defined by the sections 13, horizontal widths of pictures of the performance content items 15 are not associated with the time axis.

Further, the individual performance parts 12 are associated with a plurality of types of performance sound (i.e., types of musical instruments), such as vocal ("Vo"), keyboard ("KB"), bass ("Ba") and drums ("Dr"). In each of the performance parts is placed performance content data having performance sound corresponding to the performance part. An arranged order, on the screen, of the performance parts 12 may be set as desired.

Namely, the performance content item display section 11 of the song creation screen 10 can manage the plurality of performance content items 15, constituting the one song, separately or independently for each of the blocks 14 segmented by the two axes of the performance parts 12 and the sections 13. Specifically, the performance content item 15 placed in each of the blocks 14 may be of a vocal part of a melody section (e.g., melody A) of a music piece or a drums part of such a melody section.

In the case where the music performance content items are employed as the content items, the plurality of performance content items 15 can be reproduced, for example, section 13 by section 13 on the content reproduction screen 10 of FIG. 1. In this case, the user selects any one of the sections 13 to be reproduced (i.e., one of the sections 13 that should become an object of reproduction) and instructs reproduction of the selected section 13. In response to such a reproduction instruction given by the user, the CPU 110 reproduces a plurality of the performance content items of a plurality of the performance parts 12 (a row of the blocks 14) belonging to the selected section 13.

In the middle of the reproduction of the plurality of the performance content items belonging to the section 13 selected as an object of reproduction, the CPU 110 activates the synchronization processing of FIG. 5 on a periodical basis. Then, when a discrepancy between a current reproduction position of any of videos and a current reproduction position of an audio signal (or time information of the clock 165) is equal to or greater than the threshold value, the CPU 110 corrects the current reproduction position of the video to match the current reproduction position of the audio signal (step S2 to S5 above). The second embodiment an effectively reduce the frequency of the synchronization and thereby reduce the processing load. Further, by giving priority to the reproduction of the audio signal over the synchronization between the video and the audio signal, the second embodiment can reproduce the plurality of the performance content items, without introducing auditory disruption of a music performance, while securing synchronism between the audio signal and the videos.

In the case where music performance content items are employed as the content items as in the second embodiment, the user can change the performance content item of any desired one of performance parts over to another performance content item while visually understanding or recognizing what kind of music performance is being executed. Because the user can change the performance content to another performance content item while visually understanding or recognizing the performance through video reproduction of the plurality of the music performance content items, the user can readily enjoy music creation in which one song (music piece or musical work) is created by the user combining as desired the music performance content items. By the second embodiment providing such a simple, easy-to-use music creation tool, many persons interested in music creation can enjoy a creative pleasure of music production irrespective of their performance technique levels.

The following describe a third embodiment of the present invention in which the content reproduction apparatus of the present invention is applied to a music creation system. In the third embodiment, the content items are music performance content items as in the above-described second embodiment, and the music creation system is a system for creating one song (music piece or musical work) by combining as desired a plurality of performance content items. In one embodiment of the music creation system, the content reproduction screen 10 functions as a song creation screen. The content reproduction screen 10 functioning as the song creation screen is a screen designed for creating one "song" by combining a plurality of content items (performance content items) 15. Such one "song" is, for example, a musical work of a music piece (musical composition). Each of the performance content items comprises a video picture (video data) and performance sound (audio data) of a music performance. The performance sound is in the form of audio data representative of a music performance, such as performance sound of a musical instrument or singing voice.

The user can select a desired one of the blocks 14 on the song creation screen (i.e., content reproduction screen) 10 and change and edit as desired the performance content item 15 to be placed in the selected block 14. The user can give an instruction for changing the performance content item 15 to another performance content item 15, for example, via the performance content item selection screen 20 displayed on a different area from the performance content item display section 11 of the song creation screen. The performance content item selection screen 20 displays candidate-for-selection information indicative of one or more performance content items 15 placeable in the user-selected block 14. The candidate-for-selection information comprises the content items 15 and various attribute information that includes thumbnail images 21 of the content items 15 and various information 22 including names, evaluations, comments, etc. of the content items 15.

Using the buttons 31 to 33 of the reproduction control section 30 on the song creation screen 10, the user can control reproduction of the performance content item 15 placed in each of one or more of the blocks 14. The performance content item 15 is reproduced, for example, section by section 13. In such a case, the performance content items 15 of some or all of performance parts 12 belonging to a section 13 selected as an object of reproduction (i.e., some or all of blocks 14 arranged in a row corresponding to the selected section 13) can be reproduced simultaneously in a parallel manner. As another example, a plurality, rather than just one, of the sections 13 may be selected as an object of reproduction so that the performance content items 15 corresponding to the selected sections 13 can be reproduced, or all of the sections 13 (i.e., the entirety of one song) may be selected as an object of reproduction so that the performance content items 15 corresponding to all of the selected sections 13 can be reproduced. The video picture of each of the performance content items 15 includes the mute button 16, so that mute-ON/OFF of reproduced sound of the performance content item 15 can be controlled for each of the blocks 14. Further, a reproduction-controlling image component may be constructed such that mute-ON/OFF of reproduced sound of a plurality of performance content items 15 can be controlled collectively. Also, reproduction-controlling image components may be constructed such that ON/OFF of moving picture reproduction processing and ON/OFF of audio reproduction processing can be instructed block 14 by block 14, section 13 by section 13, part by part 12, or collectively for the entire song.

Displaying the song creation screen 10 on the display as above functions as a step of displaying a music creation screen having the plurality of blocks arranged thereon in a matrix configuration for displaying a plurality of performance content items constituting the one musical work. The aforementioned construction for managing, reproducing, editing and changing the plurality of performance content items independently for each of the blocks arranged in a matrix configuration on the song creation screen 10 allows the user to readily create a musical work by combining any of the plurality of performance content items while visually understanding or recognizing a plurality of performances, such as states of an ensemble performance of one music piece. Further, by the third embodiment providing a simple, easy-to-use music creation tool using moving-picture-contained performance content items as above, many persons interested in music creation can enjoy a creative pleasure of music production irrespective of their performance technique levels. As an example, a musical work created on the song creation screen 10 can be reproduced on a song reproduction screen different from the song creation screen 10. Such a song reproduction screen may be, for example, a screen having moving pictures of performance content items of individual performance parts put together on one page per section, or a screen having moving pictures of performance content items of individual performance parts synthesized onto a background image of a concert stage or the like.

Figure 7:
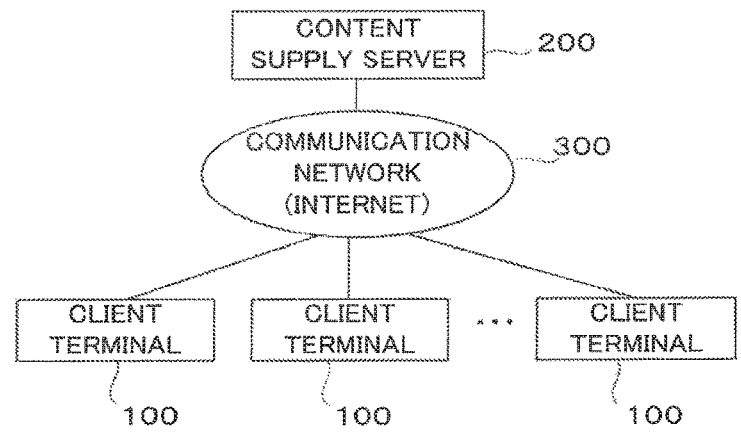
FIG. 7 is a block diagram showing an example overall setup of a music creation system including the content reproduction apparatus of the present invention.

FIG. 7 is a diagram showing an overall setup of the music creation system. The music creation system comprises the client terminals 100 and the content supply server 200 communicatively interconnected via the communication network 300. Each of the client terminals 100 is a computer that functions as the content reproduction apparatus by displaying the content reproduction screen (song creation screen) 10 of FIG. 1 on the display section. Any desired computer apparatus, such as a general-purpose personal computer (PC), a tablet computer and a smart phone, can be applied as the client terminal 100.

The content supply server 200, which is a server computer connected to the communication network 300, includes a later-described song content database so that it can supply any of the client terminals 100 with various data including performance content data. Also, the content supply server 200 supplies an application program for allowing the client terminals 100 to function as the content reproduction apparatus of the present invention and manages users using various services supplied by the server 200.

The communication network 300 is, for example, the Internet, but the present invention is not so limited, and it may be any other desired well-known type of communication network as long as it permits communication of later-described various data between the content supply server 200 and the client terminals 100.

Figure 8:
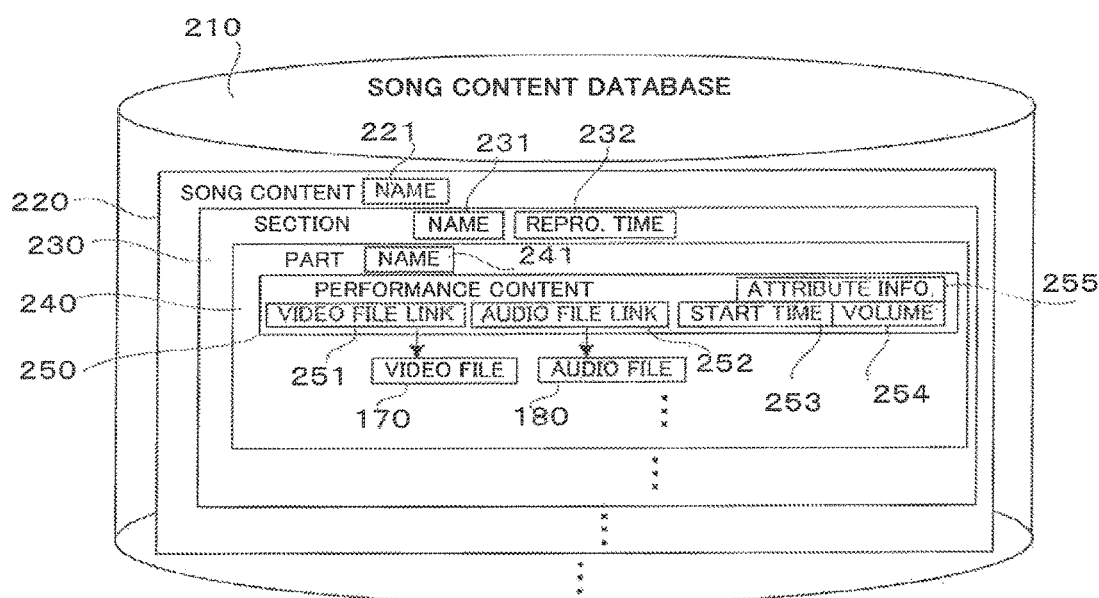
FIG. 8 is a diagram explanatory of an example data organization of a song content database in a content supply server of the music creation system.

FIG. 8 is a diagram explanatory of an example data organization of the song content database 210 provided in the content supply server 200. As shown in FIG. 8, the song content database 210 stores therein a plurality of song content items 220, each of which has a name (song name) 221 assigned thereto. Each of the song content items 220 corresponds to a musical work of one music piece.

Each of the song content items 220 comprises a plurality of section data 230 provided in corresponding to a plurality of sections 13, such as intro, melody A, melody B, . . . ending. Each of the section data 230 includes a name (section name) 231 and reproduction time data 232. The reproduction time data 232 is data indicative of a reproduction time length of the section 13 in question. For example, if the "intro" section has a time length of 15 sec., the reproduction time data 232 is indicative of "15 sec.".

Each of the section data 230 comprises a plurality of part data 240. The plurality of part data 240 in each of the section data 230 are provided in corresponding relation to musical instrument types (performance parts 12), such as "vocal", "keyboard", "bass", "drums", etc. Each of the part data 240 has assigned thereto a name 241 corresponding to the performance part in question, such as "vocal". One or more performance content items 250 are registered for each of the part data 240. Such one or more performance content items 250 registered for each of the part data 240 are candidates for selection of performance content items 250 placeable in the corresponding block 14 (one performance part 12 of one section 13). One of the one or more performance content items 250 registered for the part data 240 is placed in the corresponding block 14 (one performance part 12 of one section 13).

Construction of each of the performance content items 250 is similar in to that of the content item 250 described above in relation to FIG. 4, and thus, already-described details of the performance content item 250 will not be described here to avoid unnecessary duplication. Of the various attribute information 255 included in the performance content item 250, the "thumbnail image" is still image data cut out from a video file of the performance content item 250. The effecter data includes a type and setting of an effecter. The "evaluations" are evaluations given from one or more users and indicated, for example, by the "number of stars". The "comments" may include opinions, notes, etc. given from one or more users. Such users' evaluations and users' comments contribute to social network activities among users. The "tag" is used as search words for searching for the performance content item 250 and may comprise classification words (e.g., name of an author, musical genre and performance level) and relationships with other performance content items.

Note that the various attribute information 255 need not necessarily be stored per performance content item 250 and may be stored per part data 240, per section data 230 or per song content item 220. Alternatively, such various attribute information 255 may be stored for all or some of the content items 220-250.

As another example of the data structure representative of a song, the content supply server 200 may store one or more song scenarios 260. Whereas the aforementioned song content item 220 is a set of performance content items 250 selectable for placement in the individual blocks 14, the song scenario 260 is a variable element of the song content item 220, i.e. data identifying or indicative of performance content items 250 selected by the user and placed in the individual blocks 14. Namely, the song scenario 260 is representative of a musical work comprising a combination of a certain plurality of performance content items 250 selected as desired by the user.

Figure 9:
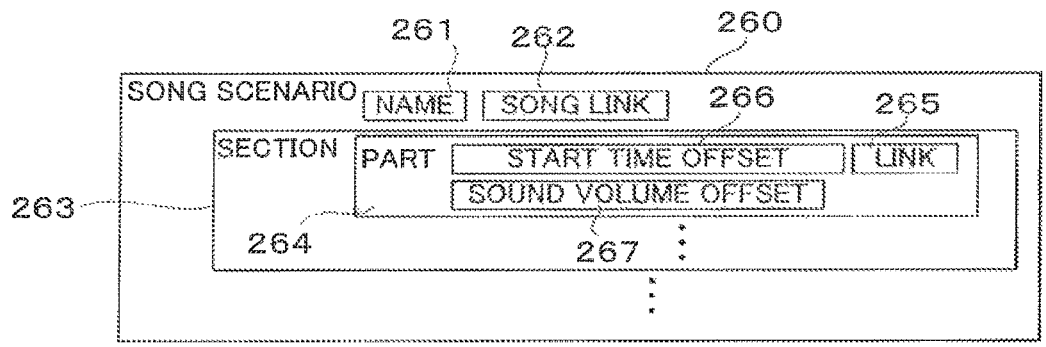
FIG. 9 is a diagram explanatory of an example data structure of a song scenario stored in the content supply server.

FIG. 9 shows an example data structure of the song scenario 260. The song scenario 260 has a name (song scenario name) 261, and a link to one song content item 220; namely, the song scenario 260 is associated with one song content item 220 in the song content database 210.

Each song scenario 260 comprises a plurality of section data 263, and each of the section data 263 comprises a plurality of part data 264. The sections and performance parts indicated by the section data 263 and part data 264 are similar in construction to the song content item 220 with which the song scenario 260 is associated. Each of the part data 264 includes link data 265 indicative of a link to one performance content item 250. More specifically, the link data 265 designates, as one performance content item 250 to be placed in one performance part (i.e., in one block 14) to which the link data 265 belongs, one of a plurality of performance content items 250 registered as candidates for selection in the corresponding part data 240 corresponding to the part data 240.

Start time offset data 266 and sound volume offset 267 relative to the performance content item are set in each of the part data 264 of the song scenario 260. The start time offset data 266 is indicative of an adjustment value (offset) from a predetermined start time (e.g., the head of data or start time data 253) of the performance content item, and the sound volume offset 267 is an adjustment value (offset) from a predetermined sound volume value (e.g., sound volume data 254) of the performance content item. Further, effect settings for the performance content item and various attribute information, such as effect settings, comments and evaluations about the performance content item, may be stored independently of the aforementioned song content item 220.

Figure 10:
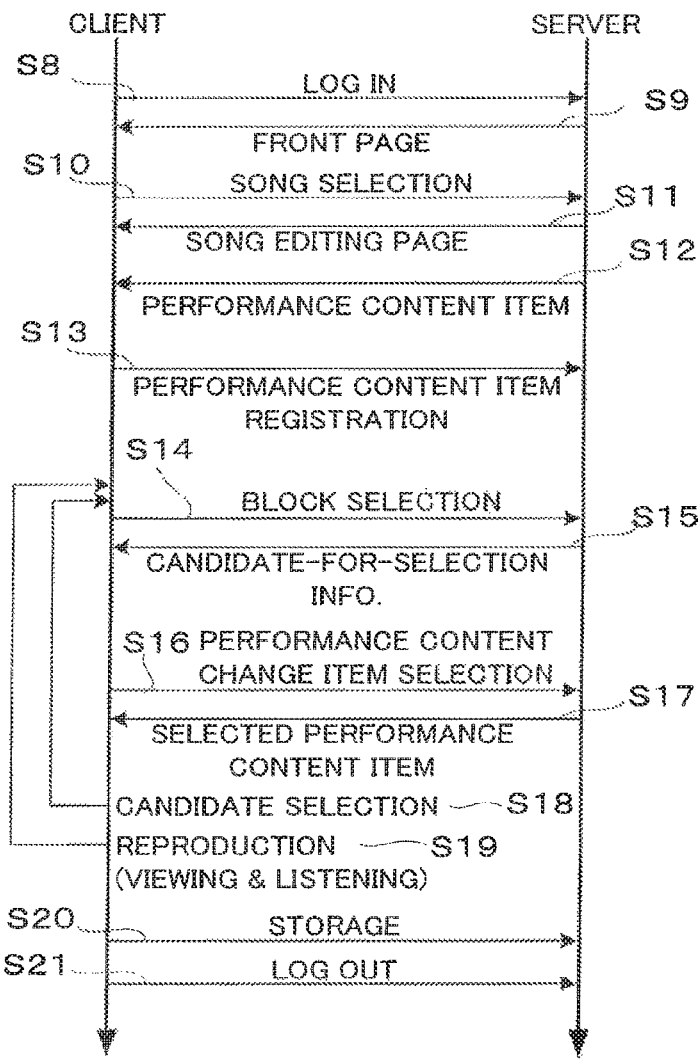
FIG. 10 is a diagram showing an example overall operational sequence of song creation processing in the music creation system shown in FIG. 7.

The following describe an example sequence of operations for the user to create and edit as desired a song content item 220 or a song scenario 260 (hereinafter collectively referred to as a "song" in cases where it is not necessary to distinguish between the song content item 220 and the song scenario 260). FIG. 10 is a diagram showing an example overall operational sequence of processing for creating and editing a song, and this processing is performed through communication between the client terminal 100 and the server 200.

At step S8, the client terminal 100 accesses the content supply server 200 via the communication network 300 and logs in to a song editing/creating service provided by the server 200. For example, the CPU 110 of the client terminal 100 displays a login page acquired from the server 200 using the web browser 160, and it logs in to the service of the server 200 by entering, for example, a user name and authentication password on the login page.

At step S9, the server 200 transmits information of a front page to the client terminal 100 having logged in to the service. The client terminal 100 displays the front page on the display section 120 using the web browser 160 and then receives selection, by the user, of a song content item or a song scenario.

As an example, the front page is a search screen displaying candidates for selection of song content items 220 on the basis of entered search words. Among examples of the search words is attribute information 255, such as a song name 221 and tags of performance content items. Search results may be displayed in any desired order, such as an order of evaluations by the user of the performance content items, a decreasing order of degrees of match of the performance content items with the search words, an order of names of the performance content items, an order of dates of creation of the performance content items, an order based on creators of the performance content items. As an alternative, the front page may be constructed to be capable of selecting one song scenario 260 on the basis of the entered search words. Among examples of the search words is attribute information 255, such as a song scenario name 261 and tags of performance content items.

As another alternative, arrangements may be made for, following the search and selection of one song content item 220, displaying a list of all song scenarios 260 linking to the one song content item 220 and allowing one song scenario 260 to be selected from among the displayed song scenarios 260. As still another alternative, arrangements may be made for allowing performance content items 250 to be searched for via the front page.

As an example, the display of the front page may include a social network function for performing information sharing and message exchange among users, search for a user, etc. Using the above-mentioned social network function, a user can present and recommend a song created by the user, present activities by other users, etc.

The client terminal 100 informs the content supply server 200 of the song selected on the aforementioned front page, at step S10. The server 200 not only transmits the content reproduction screen 10 pertaining to the selected song to the client terminal 100 at step S11, but also transmits to the client terminal 100 video files and audio files of one or more performance content items necessary for the content reproduction screen 10 at step S12. Then, the client terminal 100 stores into the RAM 112 or the storage vice 117 the video files 170 and audio files 180 (see FIG. 8) of the one or more performance content items transmitted from the server 200. Then, the CPU 110 of the client terminal 100 not only displays the content reproduction screen 10 on the display section 120 on the basis of the information transmitted to the client terminal 100 at steps S11 and S12, but also displays the performance content items 15 in the individual blocks 14.

As an example, when a song content item 220 has been selected, the server 200 at step S12 above transmits to the client terminal 100 the video files 170 and audio files 180 of the performance content items placed in the individual blocks 14 as initial settings. In another example, no performance content items may be placed in the individual blocks 14 as initial settings, and the server 200 does not transmit any performance content item 250 at step S12. In such a case, each of the blocks 14 has no performance content item placed therein (i.e., is in an empty state).

When a song scenario 260 has been selected, the server 200 at step S12 above transmits to the client terminal 100 respective video files 170 and audio files 180 of a plurality of performance content items 250 constituting the song scenario 260 (i.e., performance content items 250 placed in the individual blocks 14).

As another example or alternative, the server 200 at step S12 only transmits to the client terminal 100 information (e.g., still picture data each representative of a scene of a video) to be displayed in the individual blocks 14, without transmitting video files 170 and audio files 180 of performance content items to the client terminal 100. Then, as necessary (e.g., in response to a reproduction instruction), the server 200 may transmit video files 170 and audio files 180 to the client terminal 100.

At step S13, the user can newly register (upload) a performance content item newly created by the user into (to) a desired block 14 of the content reproduction screen 10. The following describe an example operational sequence of a new registration process for newly registering (uploading) a performance content item 250. The client terminal 100 may perform the new registration process at step S13 at any desired timing in a time period from the time when it receives the performance content item at step S12 above to a time when it logs out of the service (at later-described step S21).

Figure 11:
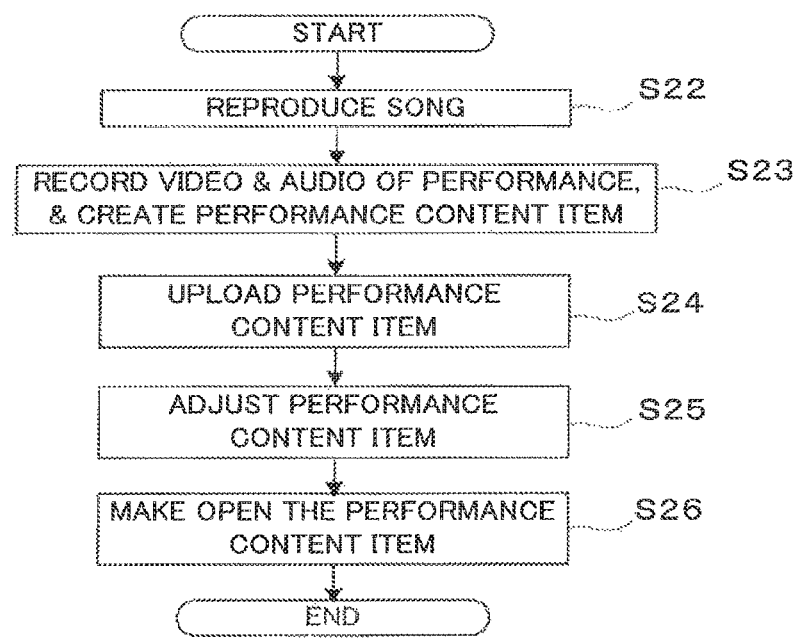
FIG. 11 is a flow chart showing an example operational sequence of a new registration process for registering a performance content item into a block on the content reproduction screen.

FIG. 11 is a flow chart showing the operational sequence of the new registration process performed in the client terminal 100 for newly registering a performance content item 250. First, the user creates a performance content item that is to be newly registered. Then, on the content reproduction screen 10, the user selects one block 14 to become a registration destination, instructs reproduction of a song or section (step S22) and records a video and audio of the performance to the reproduced sound (step S23). The CPU 110 creates performance content data containing the recorded performance (i.e., video- and audio-recorded performance) and temporarily stores the thus-created performance content into a suitable memory (e.g., RAM 112 or storage device 117). If the entirety of one song is to be reproduced at step S22, it designates one song scenario 260 as an object of reproduction. If one section is to be reproduced, the user designates, as an object of reproduction, a section in one song content item or song scenario. Let it be assumed here that a tempo at which to reproduce a song or section is determined in advance per song.

For example, at step S22, the client terminal 100 performs audio (performance sound) reproduction and video reproduction of all performance parts 12 in the song or section reproduction process. Details of the performance content item reproduction process will be discussed later. As an alternative, the reproduction process may perform only audio reproduction without performing video reproduction. As another alternative, the reproduction process may reproduce a plurality of performance parts 12 other than the performance part corresponding to the block 14 that becomes the registration destination (so-called "minus-one performance"). As still another alternative, the reproduction process at step S22 may reproduce only click sound providing a performance guide during recording.

Further, in the video and audio recording process of step S23, any desired video recording device may be used, such as one external to the client terminal 100 like a video camera, a PC or a smart phone, or one built in the client terminal 100 like a web camera of a PC. Further, any desired audio recording device may be used, such as one external to the client terminal 100 like an audio recorder or a digital musical instrument having a recording function, or one built in the client terminal 100 like a microphone built in the body of the terminal. The user may perform the video recording and the audio recording either simultaneously or independently of each other. Note that one or more still picture files may be created in place of the video file and the one or more still picture files may be reproduced in the corresponding block 14 in place of the video of the performance content item 15. Further, a MIDI file representative of contents of a music performance may be created in place of the audio file.

As an example, the video and audio recording process of step S23 can be performed on the content reproduction screen 10. In this case, the user performs video recording and audio recording while displaying in real time a video being recorded. Because this arrangement allows the user to record a video and audio of its own performance on the screen 10 while reproducing on the same screen 10 videos of a plurality of performance parts other than the performance part being performed by that user. Thus, the user can video- and audio-record its performance with a feeling of presence and unity as if executing its performance along with the performances of the other performance parts. Further, the content reproduction screen (song creation screen) may be constructed such that realtime performances of other users or persons delivered from other client terminals 100 via the communication network 300 can be displayed on the content reproduction screen (song creation screen) 10 as performances of other performance parts than that of the user. Note that realtime data communication between the client terminals 100 via the communication network 300 can itself be realized using a well-known technique. With such arrangements, users of the client terminals 100 interconnected via the communication network 300 can execute an ensemble performance via the communication network 300 while visually checking their respective realtime performances on the respective content reproduction screen 10 and record video pictures and sound of the ensemble performance.

As a modification of the construction where video pictures and sound are recorded on the content reproduction screen (song creation screen) 10, video pictures of the performance being photographed may be displayed on a window different from the content reproduction screen 10. In such a case, for each of the performance parts other than that of the user in question, only audio reproduction may be performed without video reproduction being performed in the corresponding blocks 14. In this way, it is possible to provide video-recording and audio-recording environments requiring only a reduced processing load on the client terminals 100.

At step S24, the client terminal 100 uploads video and audio files of the performance content item, created at step S23, to the content supply server 200. The content supply server 200 not only stores the uploaded video file 170 and the audio file 180 into a predetermined storage region (video/audio database), but also registers the uploaded performance content item 250 into a registration-destination block (corresponding to a performance part of a section of a certain song) within the song content database 210. In this way, the performance content item newly created this time is newly registered as a candidate for selection placeable in the block.

At the time of uploading at step S24 above, the user can manually designate a section and performance part as a registration destination, a name, a reproduction start position of the video file and the audio file and a sound volume of the performance content item. As an alternative, the server 20 may automatically calculate a suitable reproduction start position of the video file and the audio file and a suitable sound volume. Then, the server 200 sets the reproduction start position of the video file and audio file and sound volume, designated by the user or automatically calculated, as a reproduction start position 253 and sound volume data 254 to be included in the performance content item 250. By thus setting in advance the reproduction start position 253 and sound volume data 254 to be included in the performance content item 250 at the time of the registration, it is possible to reduce a processing load at the time of reproduction of the performance content.

Further, as an example, the content supply server 200 may reduce a screen size of the uploaded video file to thereby reduce a data size. As another example, only one of the video file and audio file of the performance content item may be uploaded to the content supply server 200. If the audio file has not been uploaded, the content server 200 may create an audio file for the performance content data from audio data included in the video file. As well known in the art, ordinary video files include an audio file obtained by recording sound at the time of video picture photographing. Thus, even where an audio file has not been recorded independently of recording of a video file, an audio file obtained by separating an audio file from the recorded video file can be used as an audio file constituting a performance content item.

At step S25, the client terminal 100 displays, for example on the content reproduction screen 10, a list of all performance content items previously uploaded by the user in question and additionally displays the current uploaded performance content in the list, and then the client terminal 100 receives adjustment made by the user to the displayed performance content item. Namely, the user can manually adjust the reproduction start position and the sound volume of the uploaded performance content item on the content reproduction screen 10. At the time of creation of a song scenario 260, the user can set offsets 266 and 267 of the reproduction start time and sound volume through such adjustment. Results of such adjustments are reflected in the content supply server 200.

At next step S26, the client terminal 100 makes the current uploaded performance content data open to users on the communication network 300. Thus, various information including a thumbnail of the performance content item uploaded this time as one candidate for selection is displayed in the performance content item selection screen 20 on the content reproduction screen 10. The user can make the current uploaded performance content item open to an unspecified great number of other users without the current uploaded performance content item being limited in its made-open range. Alternatively, the user may limit the made-open range of such a performance content item uploaded by the user. In the aforementioned manner, the new registration (posting) of the new registration is completed.

Referring back to FIG. 10, the user can change, on the content reproduction screen (song creation screen) 10, the performance content item 15 placed in the selected block 14 to another performance content item 15 (steps S14 to S17). Each time any one of the blocks 14 is selected on the content reproduction screen (song creation screen) 10, the aforementioned operations of steps S14 to S17 are performed for the selected block 14 (step S18).

The following describe performance content item change operations performed at steps S14 to S17. First, in response to selection, by the user, of any one of the blocks 14, the client terminal 100 transmits to the content supply server 200 information of the user-selected block 14, at step S14. Then, the server 200 transmits to the client terminal 100 information of one or more performance content items 250 placeable in the selected block 14 as candidate-for-selection information, at step S15.

The candidate-for-selection information includes various attribute information 255 including respective thumbnail images, names, creators' names and evaluations of one or more performance content items 250 registered in part data 240 corresponding to the selected block. The CPU 110 of the client terminal 100 presents, in the performance content item selection section 20 on the content reproduction screen 10, information of the one or more performance content items based on the received candidate-for-selection information.

Then, the user selects a desired one of the performance content items from the performance content item selection section 20 and instructs a change of the performance content item 15 in the block 14 over to the selected performance content item. Once the client terminal 100 informs the server 200 of the user-selected performance content item at step S16, the server 200 acquires the user-selected performance content item 250 (video file 170 and audio file 180) from the song content database 210 and transmits the acquired performance content item 250 to the client terminal 100 at step S17. Then, the client terminal 100 places the performance content item 15, transmitted from the server 200, in the selected block 14. In this way, a performance content item 15 placed in any desired one of the blocks 14 can be changed over to another performance content item 15. If no performance content item 15 is currently placed in the selected block 14, then the current selected performance content item 15 is newly placed in the selected block 14.

The user can also edit a performance content item selected via any one of the blocks 14 or content item selection screen 20 on the content reproduction screen (song creation screen) 10. Examples of such editing include adjustment of the reproduction start position, sound volume, effect, etc. In this case, the client terminal 100 informs the content supply server 200 of details of the editing of the performance content item at step S16. Then, on the basis of the details of the editing, the server 200 updates the performance content item 250 stored in the database 210 by overwriting the performance content item 250 or stores a new performance content item 250 into the database 210. Results of the editing are reflected in the display of the song creation screen of the client terminal 100.

At step S19, if the user instructs reproduction on the song creation screen 10, the client terminal 100 can reproduce substantially simultaneously a plurality of performance content items 15 of a plurality of performance parts (a row of blocks 14) belonging to one section 13 selected by the user. Because a reproduction time length of each section is determined by the reproduction time data 232, the plurality of performance content items 15 can match each other in terms of their respective reproduction start position and reproduction end position. Because a reproduction start position is set in advance when a performance content item 250 is to be newly registered at step S13, the load of the reproduction processing can be reduced as noted above, and thus, response to a reproduction instructing operation can be significantly improved.

During reproduction (viewing and listening) of all or some of the performance parts belonging to the user-selected section 13 at step S19, the performance content item in the block currently being reproduced can be changed over to another performance content item at steps S14 to S17, or a performance content item can be newly registered (newly audio-recorded) into a desired block 14 at step S13.

The performance content item reproduction process performed per section 13 at step S19 may be automatically stopped after one reproduction from the start to end of the section, or the reproduction of the section may be looped until it is manually stopped by the user. Further, the reproduction process at step S24 is not limited to the one where only one section is made an object of reproduction, and a plurality of sections may be made an object of reproduction, or the entirety of one song (one song scenario 260) may be made an object of reproduction.

The user of the client terminal 100 instructs the content supply server 200 to store in an overwriting manner or newly store results of the editing performed at steps S13 to S19 as song content 220 or song scenario 260, at step S20. In response to such an instruction, the server 200 stores in an overwriting manner or newly stores the results of the editing performed at steps S13 to S19 into the database 210 as song content 220 or song scenario 260. The client terminal 100 logs out of the song editing/creation service provided by the server 200 at step S26 and then terminates the processing.

With the aforementioned construction of the music creation system, performance content items uploaded from an unspecified great number of client terminals 100 via the communication network 300 can be cumulatively stored into the song content database 210 of the server 200. The user of each of the client terminals 100 can view and listen to cong content data 220, song scenarios 260 or performance content items created and posted by various users. Further, the user of each of the client terminals 100 can pseudo-experience an ensemble performance lightheartedly with various other users by merely adding its own performance to performance content items of the various other users placed on the song creation screen 10. Thus, the user can experience the ensemble performance lightheartedly without scrambling to gather members, making schedule adjustment among the members and/or giving consideration to a difference in performance technique level among the members. Further, the user of each of the client terminals 100 can make a musical work or performance content item created thereby open to other users, so that there can be expected, among other things, an advantageous benefit that the user can perform more fulfilling musical work creation while communicating with other users using the music creation system.

Figure 12:
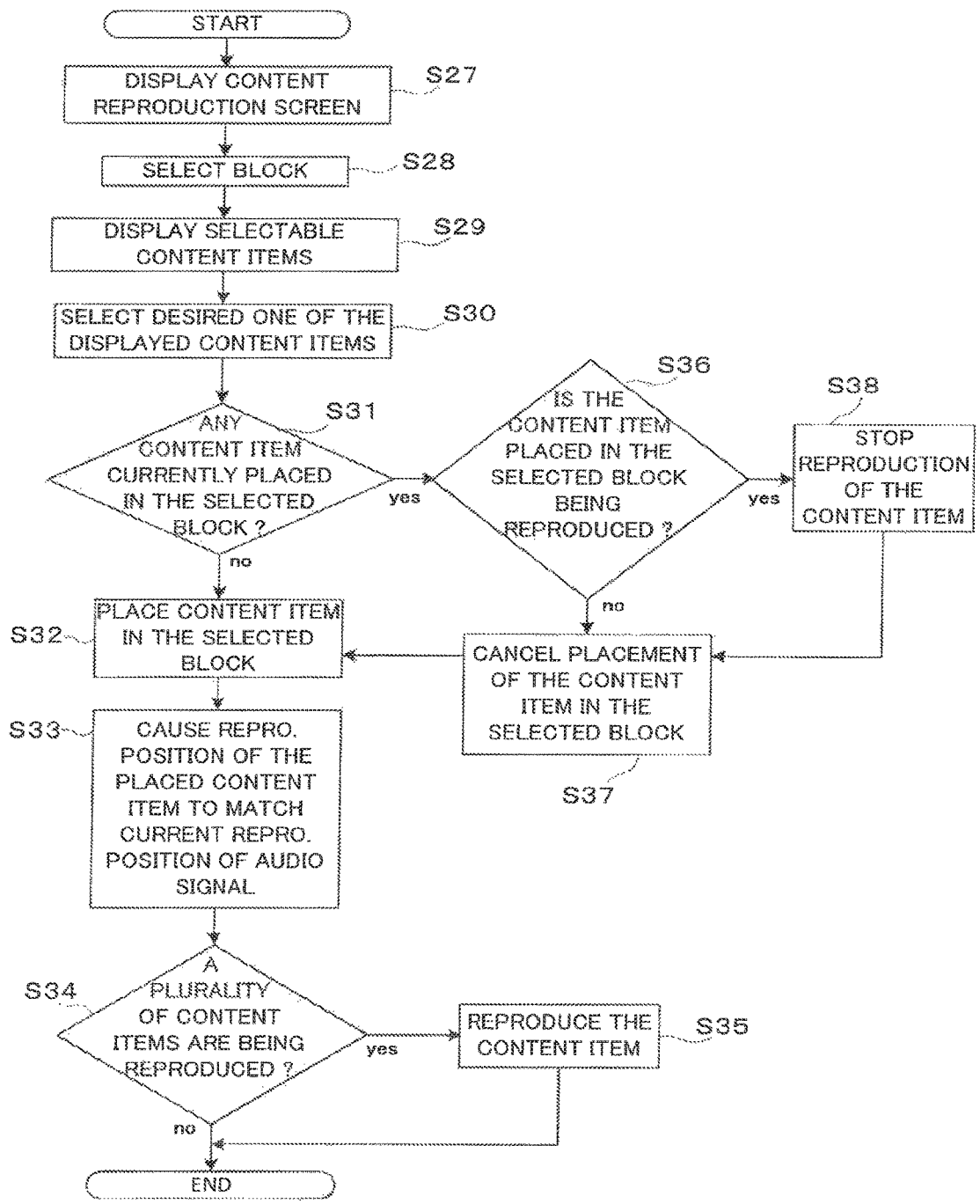
FIG. 12 is a flow chart showing an example operational sequence of content change processing performed in the content reproduction apparatus.

The following describe behavior of the content reproduction apparatus 100 when a content item change has been instructed on the content reproduction screen 10. FIG. 12 is a flow chart showing an example operational sequence of content change processing performed by the CPU 110 of the content reproduction apparatus 100. The CPU 110 displays on the display (display section) 120 the content reproduction screen 10 showing a plurality of content items at step S27. Once one of the blocks has been selected on the content reproduction screen 10 at step S28, candidate-for-selection information of one or more content items placeable in the selected block 14 (i.e., one or more content items selectable from the block 14) is displayed at step S29. Then, the user selects one content item from the content item selection section 20 at step S30.

Then, at step S31, the CPU 110 determines whether any content item is currently placed in the block 14 selected at step S28 above. If no content item is currently placed in the selected block 14, (NO determination at step S31), the CPU 110 goes to step S32, where it places in the selected block 14 the content item selected or designated at step S30 above. Then, the CPU 110 acquires a video file 170 and an audio file 180 from the placed content item, and it sets the acquired video file 170 in the video reproduction processing section 161 and sets the acquired audio file 180 in the audio reproduction processing section 162.

At next step S33, the CPU 110 acquires a current reproduction position of the audio signal from the audio reproduction processing section 162, determines, on the basis of the acquired current audio signal reproduction position, a reproduction position of the video of the content item newly designated as an object of reproduction and then controls the video reproduction processing section 161 to move the position of video reproduction on the basis of the determined reproduction position of the video. If the content item newly designated as an object of reproduction has start time data 253, the CPU 110 determines, at step S33, a reproduction position of the video on the basis of the acquired current audio signal reproduction position and the start time data 253 of the content item. Such an operation of step S33 can cause the reproduction position of the video of the newly designated content item to match the current audio signal reproduction position acquired from the audio reproduction processing section 162. At this step S33, the CPU 110 also determines a reproduction position of the audio signal of the audio signal of the content item newly designated as an object of reproduction on the basis of the current audio signal reproduction position acquired from the audio reproduction processing section 162. A combination of such step S33 and the CPU 110 functions as: a step of, when a new content item has been designated as an object of reproduction during reproduction of the plurality of content items, acquiring a current reproduction position of the audio signal (namely, an acquisition section which, when a content item has been newly designated as an object of reproduction during reproduction of the plurality of content items, acquires a current reproduction position of the audio signal); and a step of determining a reproduction position of a video of the newly designated content item on the basis of the acquired current reproduction position of the audio signal (namely, a reproduction position of determination section which determines a reproduction position of a video moving picture of the newly designated content item on the basis of the acquired current reproduction position of the audio signal).

If all or some of a plurality of content items of a section which the selected block belongs to are being reproduced on the content reproduction screen 10 (YES determination at step S34), the CPU 110 goes to step S35, where it starts reproduction of the video of the content item, newly designated as an object of reproduction this time, at the reproduction position of the video determined at step S33 above. A combination of this step S35 and the CPU 110 functions as a control section which controls the above-mentioned video reproduction processing section to start reproduction of the video of the content item, newly designated as an object of reproduction this time, at the determined reproduction position of the video. Further, the CPU 110 starts reproduction of the audio signal of the content item, newly designated as an object of reproduction this time, at the reproduction position of the audio signal determined at step S33 above. In this way, the content item newly designated as an object of reproduction this time is reproduced from a reproduction position caused or corrected to match, or conformed to, the current reproduction position of the currently-reproduced audio signal. For example, if a current reproduction position of a plurality of content items currently being reproduced is a position 10 seconds after the beginning of the section which the selected block belongs to, the content item newly designated as an object of reproduction this time, i.e. the newly added content item, is reproduced from a position 10 seconds after the reproduction start position of the content item. Thus, the user can change any desired one of the plurality of content items over to another while viewing and listening in realtime to the plurality of content items and in a natural manner without introducing any unwanted break or interruption. Because the reproduction position of the video of the content item is caused or corrected to match the current reproduction position of the currently-reproduced audio signal, the processing load can be reduced as compared to the processing where respective reproduction positions of a plurality of videos are caused or corrected to match one another. Thus, changing a content item during reproduction of a plurality of content items can be smoothly achieved.

If, on the other hand, none of the plurality of content items of the section which the selected block belongs to are being reproduced on the content reproduction screen 10 (NO determination at step S34), the CPU 110 terminates the content change processing. In such a case, the CPU 110 only displays the newly-designated content item without performing realtime reproduction. If reproduction of the section which the selected block 14 belongs to is not currently designated as an object of reproduction, the reproduction position of the newly-designated content item to be set at step S33 above is the head (or beginning) of the data or a time position indicated by the start time data 253. Further, if the reproduction of the section which the selected block 14 belongs to is under temporary suspension although that section is currently designated as an object of reproduction, reproduction of a changed-to performance content item is started at a temporarily-suspended position of the section (i.e., at a position where the reproduction of the section was temporarily stopped).

If any content item is currently placed in the block 14 selected at step S28 (YES determination at step S31), the CPU 110 goes to step S36, where it determines whether the content item currently placed in the selected block 14 is currently being reproduced. If the content item currently placed in the selected block 14 is not currently being reproduced (NO determination at step S36), the CPU 110 proceeds to step S37, where the CPU 110 cancels the placement of the content item in the selected block 14 and then performs the aforementioned operations of step S32 to S35.

If, on the other hand, the content item currently placed in the selected block 14 is currently being reproduced (YES determination at step S31 and YES determination at step S36), the CPU 110 stops the reproduction of the content item placed in the selected block 14 at step S38, cancels the placement of the content item in the selected block 14 at step S37 as above and then performs the aforementioned operations of step S32 to S35. Thus, in this case, the content item placed in the selected block 14 is changed to (or replaced with) another content item. In this case too, it is possible to change one content item to another during realtime reproduction of a plurality of content item.

As noted above, reproduction of performance content data is performed, for example, section 13 by section 13. In FIG. 1, during reproduction of a plurality of performance content items of a plurality of performance parts 12 (a row of blocks 14) belonging to one section 13, the user can select any one of the performance parts 12 (i.e., any one of the blocks 14) belonging to the section and thereby instructs that the performance content item placed in the selected block 14 be changed over to another performance content item. Once the user instructs a change-over of the performance content item to another, the CPU 110 stops reproduction of the performance content item placed in the selected block 14 (step S38 above), cancels the placement of the performance content item in the block (step S37 above) and then places a newly designated performance content item in the selected block 14 (step S32 above). Then, the CPU 110 acquires the current reproduction position of the audio signal from the audio reproduction processing section 162 and determines a reproduction position of a video of the newly-designated performance content item on the basis of the acquired current reproduction position of the audio signal (step S33 above), and then it reproduces the video of the newly-designated performance content item from the determined reproduction position of the video (steps S34 and S35 above). Note that, when one song is an object of reproduction, the CPU 110 at step S33 above determines the reproduction position of a video of the newly-designated performance content item taking a reproduction start time of the song into consideration.

By the aforementioned content change processing, the user can change a performance content item of any desired one of a plurality of performance parts pertaining to a given section (e.g., intro) over to another performance content item while viewing and listening in realtime to the plurality of performance content items and in a natural manner without introducing any unwanted break or interruption of reproduced performance video and performance sound. If the performance content item being reproduced in the block 14 is changed over to, or replaced with, another performance content item, a performance of the performance content item (changed-from performance content item) is changed, in the middle of the performance, over to a performance of the other performance content item (changed-to performance content item). Because a reproduction position of a video moving picture of the changed-to performance content item is caused or corrected to match a current reproduction position of a currently-reproduced audio signal in the above-described embodiment, the above-described embodiment can achieve a smooth changeover of the performance without introducing auditory disruption of the music performance.

Figure 13:
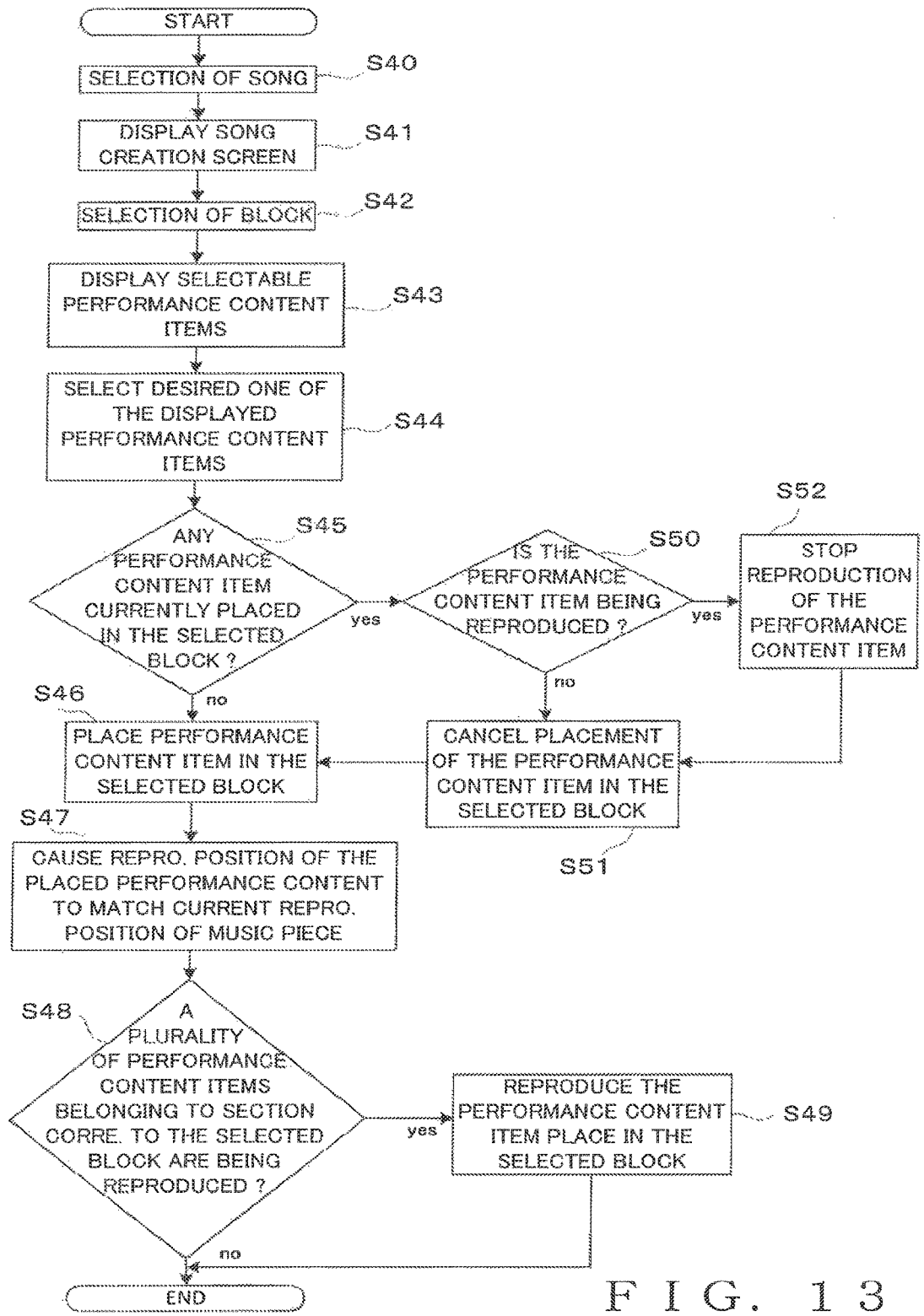
FIG. 13 is a flow chart showing an example operational sequence of change processing for changing a performance content item placed in a block over to another performance content item.

If the content item to be changed is a song, i.e. a music performance content item, in the illustrated example of FIG. 12, the operational sequence of FIG. 12 may be changed as shown in FIG. 13. In FIG. 13, user's selection of a song is received at step S40, and operations corresponding to the operations of steps S27 to S38 of FIG. 12 are performed at steps S41 to S52 following step S40.

Following step S40 in FIG. 13, a song creation screen 10 pertaining to the selected song is displayed at step S41, user's selection of any desired one of the blocks 14 on the song creation screen 10 is received at step S42, candidate-for-selection information indicative of one or more performance content items placeable in the selected block 14 is displayed on the content item selection section 20 at step S43, and the user selects one performance content item (changed-to performance content item) from the content item selection section 20 at step S44. In short, on the song creation screen 10 of a given song, the user selects one block 14 and selects one "changed-to performance content item" to be newly placed in the selected block 14.

At step S45, the CPU 110 determines whether any performance content item is currently placed in the block 14 selected at step S42 above. If no performance content item is currently placed in the selected block 14, (NO determination at step S45), the CPU 110 goes to step S46, where it places in the selected block 14 the changed-to performance content item selected at step S44 above. Then, the client terminal 100 acquires a video file 170 and an audio file 180 of the changed-to performance content item from the content supply server 200, and it sets the acquired video file 170 in the video reproduction processing section 161 and sets the acquired audio file 180 in the audio reproduction processing section 162.

Then, at step S47, the CPU 110 acquires the current reproduction position of the audio signal from the audio reproduction processing section 162, determines a reproduction position of a video moving picture of the changed-to performance content item on the basis of the acquired current reproduction position of the audio signal, and moves the position of the reproduction of the moving picture by the video reproduction processing section 161. If one song (song content 220 or song scenario 260) is currently an object of reproduction, the CPU 110 determines the reproduction positions of the audio signal and moving picture taking a reproduction start time of the song into consideration. If the changed-to performance content item 250 has start time data 253, the CPU 110 determines, at step S47, a reproduction position of the moving picture on the basis of the acquired current audio signal reproduction position and the start time data 253 of the content item. By the operation of step S47, the CPU 110 can correct the reproduction position of the moving picture of the changed-to performance content item 250 to match or conform to the current reproduction position of the audio signal acquired from the audio reproduction processing section 162. At step S47, the CPU 110 also determines a reproduction position of an audio signal of the changed-to performance content item 250 on the basis of the current audio signal reproduction position acquired from the audio reproduction processing section 162.

If a plurality of performance content items belonging to the section 13 corresponding to the selected block 14 are being reproduced (YES determination at step S48), the CPU 110 goes to step S49, where, at the reproduction position of the moving picture determined at step S47, it starts reproduction of the moving picture based on the video file 170 of the content item newly designated as an object of reproduction. In this way, the moving picture and performance sound of the changed-to performance content item 250 are reproduced from a reproduction position matching the current reproduction position of the currently reproduced audio signal. For example, if a current reproduction position of a plurality of content items currently being reproduced is a position that is 10 seconds after the beginning of the section which the selected block 14 belongs to, the changed-to performance content item 250 is reproduced from a position 10 seconds after the beginning. Thus, the user can change a performance content item of any desired one of a plurality of performance parts over to another performance content item while viewing and listening in realtime to the plurality of performance content items (moving pictures of performances and performance sound) and in a natural manner without introducing any unwanted break or interruption of the currently-reproduced moving pictures of performances and performance sound. Further, because the reproduction position of the moving pictures is caused or corrected to match the current reproduction position of the currently-reproduced audio signal, the processing load can be reduced as compared to the processing where a plurality of moving pictures are synchronized to one another.

If, on the other hand, none of the plurality of performance content items belonging to the section 13 corresponding to the selected block 14 are being reproduced (NO determination at step S48), the CPU 110 terminates the processing. In such a case, the CPU 110 only displays the changed-to performance content item in the selected block 14 without performing realtime reproduction. If reproduction of the section which the selected block 14 belongs to is under suspension, the reproduction position of the changed-to performance content item to be set at step S47 above is the head of the data or a time position indicated by the start time data 253. Further, if the section which the selected block 14 belongs to is under temporary suspension, reproduction of the changed-to performance content item is started at a temporarily-suspended position of the section.

If a performance content item is currently placed in the block 14 selected at step S42 above (YES determination at step S45), the CPU 110 goes to step S50, where it further determines whether the performance content item placed in the selected block 14 is currently being reproduced. If the performance content item placed in the selected block 14 is not currently being reproduced (NO determination at step S50), the CPU 110 cancels the placement of the content item in the selected block 14 at step S51 and then performs the aforementioned operations of step S46 to S49.

If, on the other hand, the performance content item placed in the selected block 14 is currently being reproduced (YES determination at step S45 and YES determination at step S50), the CPU 110 stops the reproduction of the performance content item placed in the selected block 14 at step S52, cancels the placement of the performance content item in the block 14 at step S51, and the performs the aforementioned operations of step S46 to S49. In this case, a performance of one performance content item (changed-from performance content item) of a plurality of performance content items of a plurality of performance parts (a plurality of blocks) being reproduced is changed, in the middle of the performance, over to a performance of another performance content item (changed-to performance content item). Because a reproduction position of a video of the changed-to performance content item is caused to match a current reproduction position of a currently-reproduced audio signal in the above-described embodiment, the above-described embodiment can achieve a smooth changeover of the music performance without introducing auditory disruption of the music performance.

Whereas the second and third embodiments of the present invention have been described above in relation to the case where content items representative of music performances are handled as an example of the content items 250, any other types of content items may be handled as long as the content items comprise video data and audio data.

Further, whereas the embodiments of the present invention have been described as constructed and implemented as the content reproduction apparatus displaying the content reproduction screen 10, the present invention may be constructed and implemented as a content reproduction method and a computer for causing a computer to perform content reproduction processing.

This application is based on, and claims priorities to, JP PA 2013-162751 filed on 5 Aug. 2013, JP PA 2013-162752 filed on 5 Aug. 2013 and JP PA 2013-162753 filed on 5 Aug. 2013. The disclosure of the priority applications, in its entirety, including the drawings, claims, and the specification thereof, are incorporated herein by reference.

What is claimed is:

1. A computer-implemented method of creating a musical work from a combination of a plurality of performance content items each containing video data and audio data, the method comprising:

a displaying step of displaying, on a display device, a music creation screen displaying a plurality of blocks, including first, second, third, and fourth blocks, arranged in a matrix arrangement for displaying the plurality of performance content items constituting the musical work, each of the plurality of blocks being designatable to reproduce a video from the video data of one of the plurality of performance content items; and a reproducing step of, in response to a single reproduction instruction given by the user, reproducing both the videos and sound based on the video data and the audio data of the performance content items associated with the blocks, wherein the reproducing step simultaneously plays at least first and second videos associated with at least the first and second performance content items of at least the first and second blocks arranged in one of one row or column, without playing at least third and fourth videos associated with at least the third and fourth performance content items of at least the third and fourth blocks arranged in one of another row or column, and thereafter, without playing the at least the first and second videos, sequentially playing at least the third and fourth videos associated with the at least the third and fourth performance content items of the at least the third and fourth blocks arranged in the one of another row or column, respectively after playing of the at least the first and second videos ends, the at least the third and fourth videos, when played, are simultaneously played together.

2. The method according to claim 1, wherein a time axis constituting the musical work is represented along one of a row or column of the matrix arrangement while types of performance sound constituting the musical work are represented along the other of the row or column of the matrix arrangement.

3. The method according to claim 1, further comprising a performance content changing step of, in response to a change instruction given by a user, changing the performance content item in a user-selected one of the plurality of blocks to another performance content item selected by the user, among the plurality of performance content items.

4. The method according to claim 3, wherein the performance content changing step:
includes a candidate displaying step of displaying a content-item selection screen that displays candidate-for-section information, indicative of one or more performance content items placeable in a block, among the plurality of blocks, selected by the user, the content-item selection screen being displayed at a different region from the music creation screen; and
places in the selected block one performance content item associated with the candidate-for-section information selected by the user.

5. The method according to claim 1, further comprising a storing step of storing the performance content items currently placed in the plurality of blocks as a musical work defined by positions of the blocks in which the performance content items are placed.

6. The method according to claim 5, wherein the storing step stores the video data and the audio data of each of the performance content items separately from each other.

7. The method according to claim 1, wherein the plurality of blocks arranged in the matrix arrangement also includes a block that displays in realtime a performance content item representative of a performance input by the user.

8. The method according to claim 1, wherein the reproduction step comprises:
an audio reproduction step of reproducing an audio signal from the audio data of one performance content item, among the plurality of performance content items;
a video reproduction step of reproducing the video from the video data of the one performance content item;
a detection step of detecting a discrepancy between a reproduction position of the audio signal and a reproduction position of the video during the audio and video reproduction steps; and
a correction step of, when the discrepancy detected in the detection step is greater than a threshold value, correcting the reproduction position of the video based on the reproduction position of the audio signal.

9. The method according to claim 8, wherein:
the audio reproduction step mixes a plurality of audio signals based on audio data of multiple performance content items, among the plurality of content items, into one audio signal and reproduces the mixed audio signal;
the video reproduction step reproduces a plurality of videos simultaneously based on video data of the multiple performance content items; and
the detection step detects a discrepancy between a current reproduction position of the mixed audio signal and a reproduction position of each of the multiple videos associated with the multiple performance content items.

10. The method according to claim 8, wherein the correction step calculates a correction amount for causing the reproduction position of the video to match the reproduction position of the audio signal and correcting the reproduction position of the video based on the calculated correction amount and the reproduction position of the audio signal.

11. The method according to claim 8, further comprising:
an updating step of updating a number-of-correction parameter each time the discrepancy is detected,
wherein the correction step calculates the correction amount based on the number-of-correction parameter.

12. The method according to claim 9, wherein the reproducing step further includes:
an acquisition step of acquiring a current reproduction position of the audio signals from a clock that provides time information for controlling reproduction of the multiple performance content items.

13. The method according to claim 12, wherein:
each of the plurality of performance content items has start position data indicative of a start position of the respective video thereof, and
the video reproduction step determines the reproduction position of the video based on the acquired current reproduction position of the audio signals and the start position data of the video.

14. A music creation apparatus for creating a musical work based on combination of a plurality of performance content items, the performance content items each containing video data and audio data, the music creation apparatus comprising:
a memory; and
a processor configured to implement instructions stored in the memory and execute: a displaying task that displays, on a display device, a music creation screen displaying a plurality of blocks, including first, second, third, and fourth blocks, arranged in a matrix arrangement for displaying the plurality of performance content items, each of the plurality of blocks being designatable to reproduce a video from the video data of one of the plurality of performance content items; and
a reproducing task that, in response to a single reproduction instruction given by the user, reproduces both the videos and sound based on the video data and the audio data of the performance content items associated with the blocks,
wherein the reproducing task simultaneously plays at least first and second videos associated with at least the first and second performance content items of at least the first and second blocks arranged in one of one row or column, without playing at least third and fourth videos associated with at least the third and fourth performance content items of at least the third and fourth blocks arranged in one of another row or column, and thereafter, without playing the at least the first and second videos, sequentially plays at least the third and fourth videos associated with the at least the third and fourth performance content items of the at least the third and fourth blocks arranged in the one of another row or column, respectively after playing of the at least the first and second videos ends, the at least the third and fourth videos, when played, are simultaneously played together.

15. The music creation apparatus according to claim 14, wherein the reproducing task comprises:
an audio reproduction task that reproduces an audio signal from the audio data of one performance content item, among the plurality of performance content items;
a video reproduction task that reproduces the video from the video data of the one performance content item;
a detection task that detects a discrepancy between a reproduction position of the audio signal and a reproduction position of the video during the audio and video reproduction tasks; and a correction task that, when the discrepancy detected by the detection task is greater than a threshold value, corrects the reproduction position of the video based on the reproduction position of the audio signal.

16. The music creation apparatus according to claim 14, wherein the processor is further configured to execute:

a performance content changing task that, in response to a change instruction given by a user, changes the performance content item in a user-selected one of the plurality of blocks, to another performance content item selected by the user, among the plurality of performance content items.

17. A non-transitory computer-readable storage medium storing instructions executable by a computer to perform a method of creating a musical work based on combination of a plurality of performance content items, the performance content items each containing video data and audio data, the method comprising:

a displaying step of displaying, on a display device, a music creation screen displaying a plurality of blocks, including first, second, third, and fourth blocks, arranged in a matrix arrangement for displaying the plurality of performance content items constituting the musical work, each of the plurality of blocks being designatable to reproduce a video from the video data of one of the plurality of performance content items; and a reproducing step of, in response to a single reproduction instruction given by the user, reproducing both the videos and sound based on the video data and the audio data of the performance content items associated with the blocks, wherein the reproducing step simultaneously plays at least first and second videos associated with at least the first and second performance content items of at least the first and second blocks arranged in one of one row or column, without playing at least third and fourth videos associated with at least the third and fourth performance content items of at least the third and fourth blocks arranged in one of another row or column, and thereafter, without playing the at least the first and second videos, sequentially playing at least the third and fourth videos associated with the at least the third and fourth performance content items of the at least the third and fourth blocks arranged in the one of another row or column, respectively after playing of the at least the first and second videos ends, the at least the third and fourth videos, when played, are simultaneously played together.

18. The non-transitory computer-readable storage medium according to claim 17, wherein the reproducing step further comprises:

an audio reproduction step of reproducing an audio signal from the audio data of one performance content item, among the plurality of performance content items;

a video reproduction step of reproducing the video from the video data of the one performance content item;

a detection step of detecting a discrepancy between a reproduction position of the audio signal and a reproduction position of the video during the audio and video reproduction steps; and a correction step of, when the discrepancy detected in the detection step is greater than a threshold value, correcting the reproduction position of the video based on the reproduction position of the audio signal.

19. The non-transitory computer-readable storage medium according to claim 17, further comprising:

a performance content changing step of, in response to a change instruction given by a user, changing the performance content item in a user-selected one of the plurality of blocks, to another performance content item selected by the user, among the plurality of performance content items.

20. A music creation system for creating a musical work based on combination of a plurality of performance content items, the performance content items each containing video data and audio data, the music creation system comprising:

a server including a database storing the plurality of performance content items constituting a musical work; and a client terminal communicable with the server via a network and comprising:

a memory; and a processor configured to implement instructions stored in the memory and execute:

a content item-acquiring task that acquires from the database of the server, the plurality of performance content items constituting the musical work;

a displaying task that displays, on a display device, a music creation screen displaying a plurality of blocks, including first, second, third, and fourth blocks, arranged in a matrix arrangement for displaying the plurality of performance content items, each of the plurality of blocks being designatable to reproduce a video from the video data of one of the plurality of performance content items; and a reproducing task that, in response to a single reproduction instruction given by the user, reproduces both the videos and sound based on the video data and the audio data of the performance content items associated with the blocks, wherein the reproducing task simultaneously plays at least first and second videos associated with at least the first and second performance content items of at least the first and second blocks arranged in one of one row or column, without playing at least third and fourth videos associated with at least the third and fourth performance content items of at least the third and fourth blocks arranged in one of another row or column, and thereafter, without playing the at least the first and second videos, sequentially plays at least the third and fourth videos associated with the at least the third and fourth performance content items of the at least the third and fourth blocks arranged in the one of another row or column, respectively after playing of the at least the first and second videos ends, the at least the third and fourth videos, when played, are simultaneously played together.

21. The music creation system according to claim 20, wherein the processor is further configured to execute:

a performance content changing task that, in response to a change instruction given by a user, changes the performance content item in a user-selected one of the plurality of blocks, to another performance content item selected by the user, among the plurality of performance content items.

* * * * *